US007010550B2

(12) United States Patent  
Tarlie

(10) Patent No.: US 7,010,550 B2
(45) Date of Patent: Mar. 7, 2006

(54) SYSTEM FOR AND METHOD OF GOLF PERFORMANCE RECORDATION AND ANALYSIS

(76) Inventor: Martin B. Tarlie, 910 University Pl., Suite B-212, Evanston, IL (US) 60201

( * ) Notice: Subject to any disclaimer, the term of this patent is extended or adjusted under 35 U.S.C. 154(b) by 0 days.

(21) Appl. No.: 10/753,532

(22) Filed: Jan. 9, 2004

(65) Prior Publication Data

US 2004/0162125 A1    Aug. 19, 2004

Related U.S. Application Data

(63) Continuation of application No. 09/732,126, filed on Dec. 7, 2000, now Pat. No. 6,697,820.

(60) Provisional application No. 60/176,341, filed on Jan. 14, 2000.

(51) Int. Cl.
*G06F 17/30* (2006.01)

(52) U.S. Cl. .................................. 707/104.1; 707/102

(58) Field of Classification Search ................ 707/101, 707/102, 104.1; 434/252; 473/131, 407; 700/91, 92; 701/203; 715/848
See application file for complete search history.

(56) References Cited

U.S. PATENT DOCUMENTS

| | | | |
|---|---|---|---|
| 5,095,430 A | 3/1992 | Bonito et al. ................. 700/92 |
| 5,434,789 A | 7/1995 | Fraker et al. ................ 473/407 |
| 5,507,485 A | 4/1996 | Fisher ......................... 473/407 |
| 5,558,333 A | 9/1996 | Kelson et al. ............... 473/131 |
| 5,664,880 A | 9/1997 | Johnson et al. ............. 473/407 |
| 5,685,786 A | 11/1997 | Dudley ....................... 473/407 |
| 5,762,561 A | 6/1998 | Zine ............................ 473/131 |
| 5,795,237 A | 8/1998 | Miyamoto .................. 473/131 |
| 5,797,809 A | 8/1998 | Hyuga ........................ 473/407 |
| 5,810,680 A * | 9/1998 | Lobb et al. .................. 473/407 |
| 5,835,094 A * | 11/1998 | Ermel et al. ................ 715/848 |
| 6,456,938 B1 * | 9/2002 | Barnard ....................... 701/213 |

OTHER PUBLICATIONS

Hale, T., "Analyzing Play: Performance Statistics," Golf, The Scientific Play, Aston Publishing Group (Hertfordshire, U.K.), p. 242-247.
Analyze and Improve your Golf Game with Golf Insight, <http://www.golfinsight.com/default/html> (2000).
BunkerShot.com Golf: Software, <http://216.156.249.101/links/Software/> (2000).
Golf Links From Golf Bytes, <http://www.golfbytes.com/>.
Golflogix—measuring the game of golf, <http://www.golflogix.com/home.asp?tada>.
Golf Software: Golf Statistics Pro (GStat) by MagaDraw, <http://www.magadraw.com/> (Jun. 4, 2001).
Golf Software—Statistics and Handicap for golfers, <http://www.golfstatdoctor.com/>.
golfsyndications.com—Customized interactive sticky content on your website, <http://www.golfsyndications.com/cgi/default.asp>.
IntelliGolf—#1 Golf Scorecard Software for Palm handhelds, Handspring Visor, Pocket PCs, and . . . , <http://www.intelligolf.com/>.
SportSoft Golf, <http://www.sportsoftgolf.com/cgi/default.asp>.
ultraCaddie—The Ultimate Golfing Companion, <http://www.ultracaddie.com/cgi/default.asp>.
Welcome to GolfServ, <http://www.golfserv.com/apps/homepages/home.asp?Source=GSO>.
Microcomputer Software, Inc., <http://www.shot-saver.com>.

* cited by examiner

*Primary Examiner*—Apu M. Mofiz
(74) *Attorney, Agent, or Firm*—Winston & Strawn LLP

(57) ABSTRACT

A system for and method of golf performance recordation and analysis are provided. In accordance with the present invention, a user records hole-level and shot-level performance data for rounds of golf played by one or more players in a data acquisition component and uploads the performance data to a centralized database. The stored information can later be retrieved from the database by the user for visualization and analysis.

5 Claims, 31 Drawing Sheets

Figure 5

Edit Shot 5 - Ace-It Golf - Microsoft Internet ...

Break: Unknown ▾   Slope: Unknown ▾

Distance (ft):

Direction: ○ Left  ○ OK  ○ Right

Distance:  ○ Short  ○ OK  ○ Long

Difficulty: ○ Easy  ○ Hard

[ Submit ]   [ Cancel ]

Figure 17a

Putt 1 Properties

Break: Unknown ▾   Slope: Unknown ▾

Flat
Left-to-Right
Right-to-Left
Unknown

Distan...   ● Ft   ○ M

Figure 17b

Upload Rounds

Select Player
- atarlie - 0 Rounds
- bmay - 0 Rounds
- cytarlie - 0 Rounds
- jhayes - 0 Rounds
- mtarlie - 3 Rounds
- sdunlap - 0 Rounds
- twoods - 0 Rounds

*Refresh List*

Upload Selected Rounds

Ace-It Username: mtarlie

Ace-It Password:

Select rounds to upload:
- ☑ 9/4/00 - Inverness
- ☑ 7/16/00 - Pine Meadow Golf Club
- ☑ 7/15/00 - Orchard Valley G C

*Upload Selected Rounds*

Figure 21

Pitch Shots: 0 - 100

118 Shots - 11.8 Shots/Round

Hit Green

Hit Green: 73%

| | |
|---|---|
| Inside 6": | 12% |
| 7" - 12": | 13% |
| 13" - 24": | 33% |
| Outside 24": | 15% |

When you hit the green your hole out average is 3.1

Inside 12' your hole out avg is 2.7

Missed Green

Missed Green: 27%

| | |
|---|---|
| Chips: | 19% |
| Pitches: | 8% |
| Penalties: | 1% |
| Outside 75: | 0% |

When you miss the green your hole out average is 3.8

- ● Down in 2: 9%
- ○ Down in 3: 59%
- ● Down in 4: 26%
- ● Down in 5: 5%
- ○ Down in 6: 0%

SYSTEM FOR AND METHOD OF GOLF PERFORMANCE RECORDATION AND ANALYSIS

CROSS-REFERENCE TO RELATED APPLICATIONS

This application is a continuation of U.S. application Ser. No. 09/732,126 filed Dec. 7, 2000, now U.S. Pat. No. 6,697,820 which claims the benefit of U.S. Provisional Application No. 60/176,341 filed Jan. 14, 2000, the content of each of which is incorporated herein by reference thereto.

BACKGROUND OF THE INVENTION

1. Field of the Invention

The present invention relates to the sport of golf. More particularly, the present invention relates to a computer-implemented system for and method of recording and analyzing golf performance.

2. Description of the Prior Art

Golf is one of the most popular sports in the United States. With the recent entrance of Tiger Woods into the golfing spotlight, the popularity of golf continues to increase at a rapid rate.

Because of the high level of difficulty associated with the game of golf, players are constantly searching for ways to improve their golf skills. Aside from instructional books and equipment, one improvement tool which is gaining popularity is the use of computers to record and analyze golf performance.

Today's market contains various computer-related products designed to help players improve their golf performance. These products take the form of both stand-alone software packages and Internet Web sites. These prior art products, however, have largely proven unsatisfactory to many consumers for a number of reasons. First, many of these prior art products have limited utility and versatility, often making them undesirable to the average consumer. Second, many of these prior art products are functionally complicated and difficult to use, further rendering them undesirable to consumers. Third, many of these prior art products do not provide a simple and user-friendly user interface, further making them difficult to use. Fourth, many of these prior art products only record aggregate performance data (e.g., total number of strokes, total number of putts, strokes per hole, etc.). The lack of shot-specific data results in rudimentary analytic capabilities, severely limiting the utility of these products.

In view of the foregoing, it is an object of the present invention to provide a computer-implemented golf performance recording and analysis tool which overcomes the problems associated with the prior art. It is a further object of the present invention to provide a computer-implemented golf performance recording and analysis tool which has increased utility and versatility as compared to the prior art and which is easier to use. It is a further object of the present invention to provide a computer-implemented golf performance recording and analysis tool which provides a more simple and user-friendly user interface as compared to prior art products. It is a further object of the present invention to provide a computer-implemented golf performance recording and analysis tool which records data at the shot-level and uses the recorded data to provide detailed and comprehensive analytic functionality. Other objects of the present invention will become apparent from the following discussion.

SUMMARY OF THE INVENTION

The present invention achieves the foregoing and other objects by providing a novel and non-obvious system for and method of golf performance recordation and analysis.

A system and method in accordance with the present invention allow golfers to record hole-level and shot-level performance information for rounds of golf played by one or more players, store this information in a centralized accessible database, and analyze this information in order to aid in the improvement of golf performance.

In accordance with one embodiment of the present invention, a user can download software from a World-Wide-Web ("WWW") site or other computer readable medium, such as a floppy disk. The user can then use the downloaded software, which can run as a standalone application, on, for example, a personal or laptop computer or personal digital assistant ("PDA") or as a plug-in to a WWW browser, to input hole-level and shot-level performance information for particular rounds of golf This information can then be uploaded to the WWW site by the user for storage. The user can subsequently download any portion of the stored information (e.g., information relating to a particular round of golf) at any time from the WWW site and use the downloaded software to visualize and analyze the information to, inter alia, identify his/her strengths and weaknesses and improve future performance. Alternatively, the WWW site itself can be provided with analytical functionality which can be used by the user to analyze stored data.

In accordance with a second embodiment of the present invention, rather than downloading the software and course images from the WWW site, the WWW site itself can be provided with functionality that enables the user to connect to the WWW site using a WWW browser, input golf performance information into the browser, and upload the information to the WWW site for storage using the browser. The WWW site can also be provided with analytical functionality which the user can use for analysis of the stored golf performance information. Because all of the software is contained on the WWW site, the user does not have to specially configure his/her computer (other than having a functional WWW browser, which is a standard feature on virtually all computers sold today).

The present invention will now be described in greater detail with frequent reference being made to the drawings identified below in which identical numerals represent identical elements.

BRIEF DESCRIPTION OF THE DRAWINGS

In the accompanying drawings:

FIG. 5 is a screen shot of an alternate Interactive Scorecard layout in accordance with one embodiment of the present invention;

FIG. 17a is a screen shot of a dialog box for editing putt properties in the Putt Editor for a WWW browser in accordance with one embodiment of the present invention;

FIG. 17b is a screen shot of a dialog box for editing putt properties in the Putt Editor for a handheld computer in accordance with one embodiment of the present invention;

FIG. 21 shows an exemplary dialog box used by a handheld computer user to upload selected player rounds from the handheld computer to the WWW site;

DESCRIPTION OF THE PREFERRED EMBODIMENTS

The following description is presented to enable any person of ordinary skill in the art to make and use the present invention. Various modifications to the preferred embodiments will be readily apparent to those of ordinary skill in the art, and the disclosure set forth herein may be applicable to other embodiments and applications without departing from the spirit and scope of the present invention and the claims hereto appended. Thus, the present invention is not intended to be limited to the embodiments described, but is to be accorded the broadest scope consistent with the disclosure set forth herein.

Figure 1:
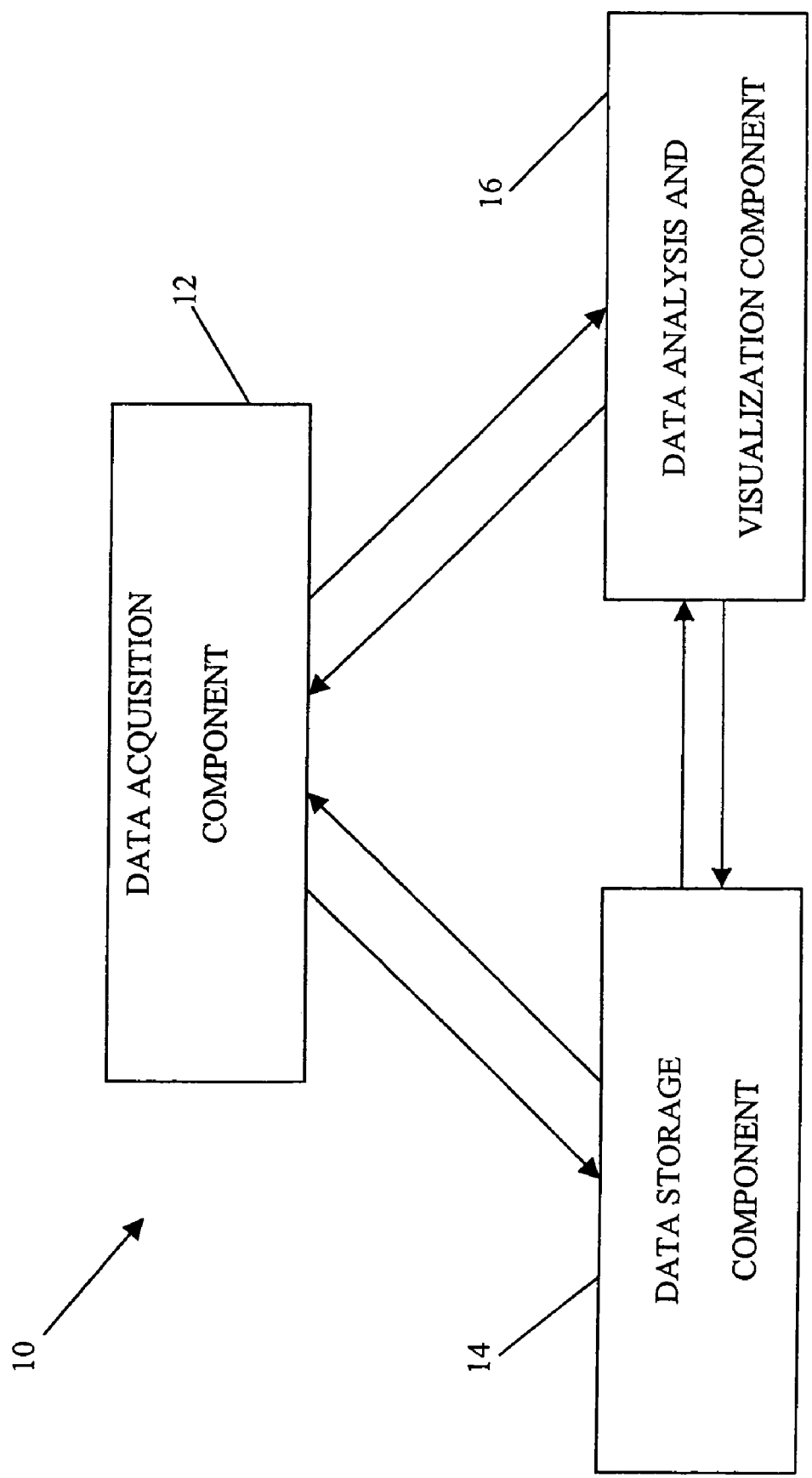
FIG. 1 is a schematic diagram of a golf performance recordation and analysis system in accordance with one embodiment of the present invention.

Referring to FIG. 1, a schematic diagram of a golf performance recordation and analysis system 10 in accordance with one embodiment of the present invention is shown. The system 10 includes a data acquisition component 12 which is used by a system user to input golf performance data into the system 10; a data storage and information processing component 14 which is used to store golf performance data in a centralized accessible database; and a data analysis/visualization component 16 which is used by a system user to analyze and visualize golf performance data. These three system components will now be described in greater detail.

I. Data Acquisition

As indicated above, there are at least two different methods of data acquisition which may be used in accordance with the present invention: (1) off-line data acquisition in which the user inputs golf performance data into a computer (as used herein, the term "computer" refers to any type of data acquisition device capable of performing the functions described herein, including, but not limited to, a personal computer, a lap top computer or a PDA (e.g., cell phone, PalmPilot)) using appropriately configured software and uploads the data to a WWW site for centralized storage; and (2) on-line data acquisition in which the user connects to a WWW site using a WWW browser and inputs and uploads golf performance data to the WWW site for storage using the WWW browser. Those of ordinary skill in the art will appreciate, however, that both off-line and on-line data acquisition are not limited to use of a WWW site for storage. Rather, any computer on any accessible communications network may be used for data storage without departing from the scope of the present invention. Moreover, if desired, the data may be stored on the acquiring computer itself rather than or in addition to the centralized database.

With off-line data acquisition, the user will generally be required to install appropriately configured data acquisition software and, optionally, golf course images on his/her computer. The software and optional golf course images may be provided to the user by portable medium, such as floppy disk or CD-ROM, but will preferably be provided to the user via the Internet. In this embodiment, the user will connect to an appropriately configured WWW site and will download the software and optional course images from the WWW site using the WWW browser on the user's computer. The software and optional course images will then be used by the user to record golf performance data. The user will preferably use a PDA or other portable computer and input the data into the computer during the golf round. Alternatively, the user can record the data using booklets, paper or the like during the golf round or by memory and input the performance data into a computer at a later time.

With on-line data acquisition, the user will not be required to install any data acquisition software or course images on his/her computer. Rather, all of the software will be contained on the WWW site (or other server computer). The user only requires an appropriately configured WWW browser which will enable the user to connect to the WWW site and download appropriate Web pages (in HTML or other format) from the WWW site, input performance data using the downloaded pages, and upload the inputted data to the WWW site for storage. The user can enter the data and upload the same to the WWW site during the golf round by using a wireless device such as a PDA which has Internet access or, alternatively, the data can be written down during the round or simply remembered by the player or user and input and uploaded by the user at a later time.

Regardless of the data acquisition method which is actually implemented (i.e., on-line or off-line), the data acquisition functionality from the point of view of the user is the same. As indicated above, the only difference is whether the data acquisition software resides on the client (the user's computer) or the server (the WWW site).

The data acquisition component 12 of the present invention will now be described with reference to the preferred embodiments. Those of ordinary skill in the art will appreciate, however, that the present invention is not limited to the preferred embodiments or the specific data acquisition methods described herein. Thus, different functionality and graphical-user-interfaces may be used in accordance with the present invention without departing from the scope of the present invention or the appended claims.

Figure 2:
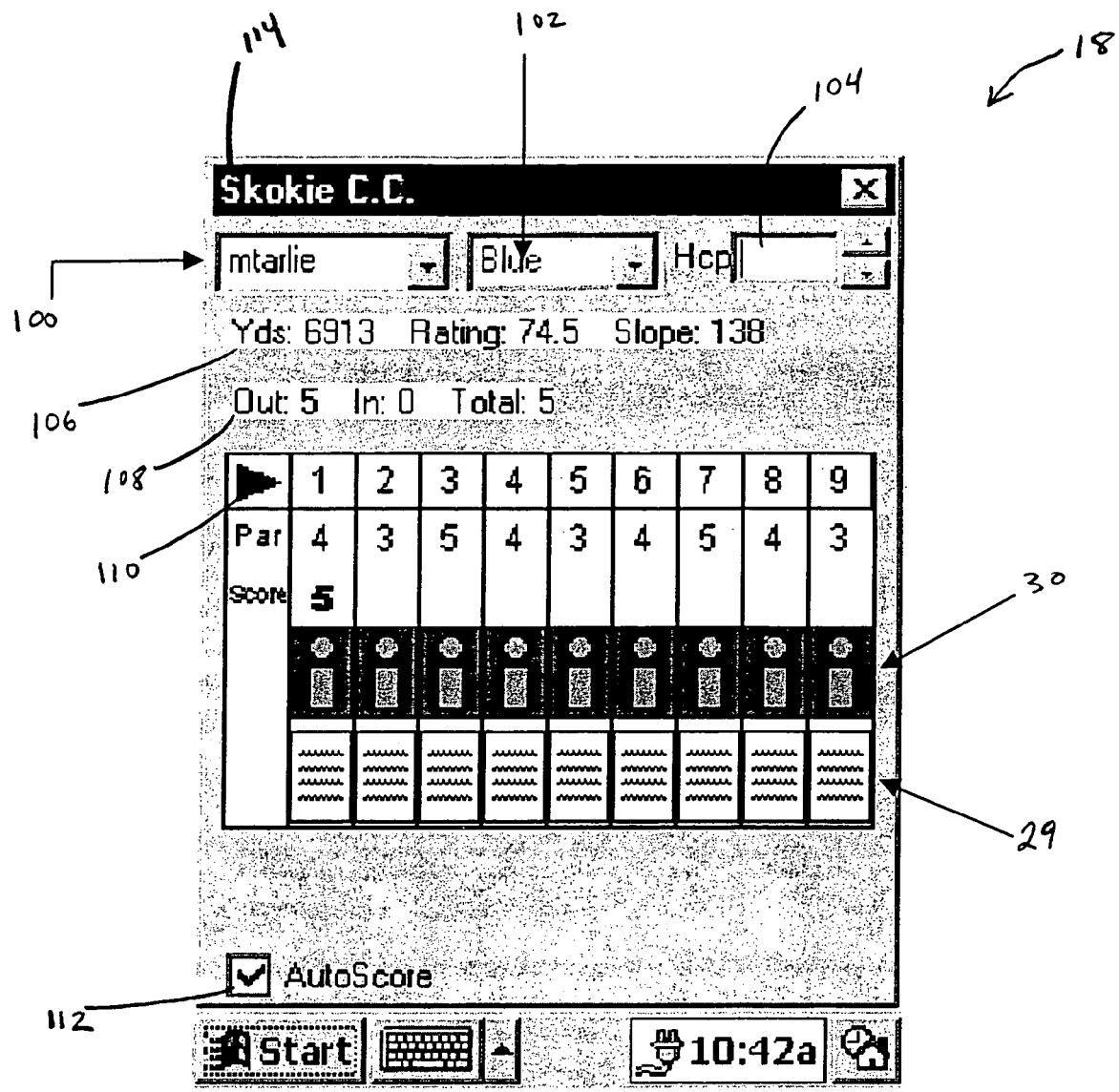
FIG. 2 is a screen shot of an Interactive Scorecard in accordance with one embodiment of the present invention.

Referring to FIG. 2, in accordance with a preferred embodiment of the present invention, data acquisition is effected through use of an Interactive Scorecard 18 which provides the user with a graphical-user-interface resembling a traditional golf scorecard. Information is preferably entered by the user into the Interactive Scorecard 18 through use of four different software modules: a Hole Summary Editor 20; a Hole Editor 22; a Putt Editor 24; and a Pin Location Editor 26. Those of ordinary skill in the art will appreciate, however, that data acquisition in accordance with the present invention is not limited to data acquisition via an Interactive Scorecard or the foregoing software modules. Rather, data acquisition in accordance with the present invention may be effected via any appropriate means.

Referring to FIG. 2, an exemplary Interactive Scorecard 18 is shown. The scorecard includes a first input box 100 which allows the user (typically the system user will also be a player, but not always) to select the player, a second input box 102 which allows the user to select the tees being played by the player, and a third input box 104 which allows the user to select the handicap of the player. The Interactive Scorecard 18 also includes a course information box 106 which displays the course length, rating and slope, as well as a score box 108 which keeps a running tally of the player's score, on a front-nine, back-nine and aggregate basis. The Interactive Scorecard 18 also includes Hole Summary Editor and Hole Editor icons 29, 30 which are used to invoke the respective modules, as well as the name of the golf course played 114.

Figure 3:
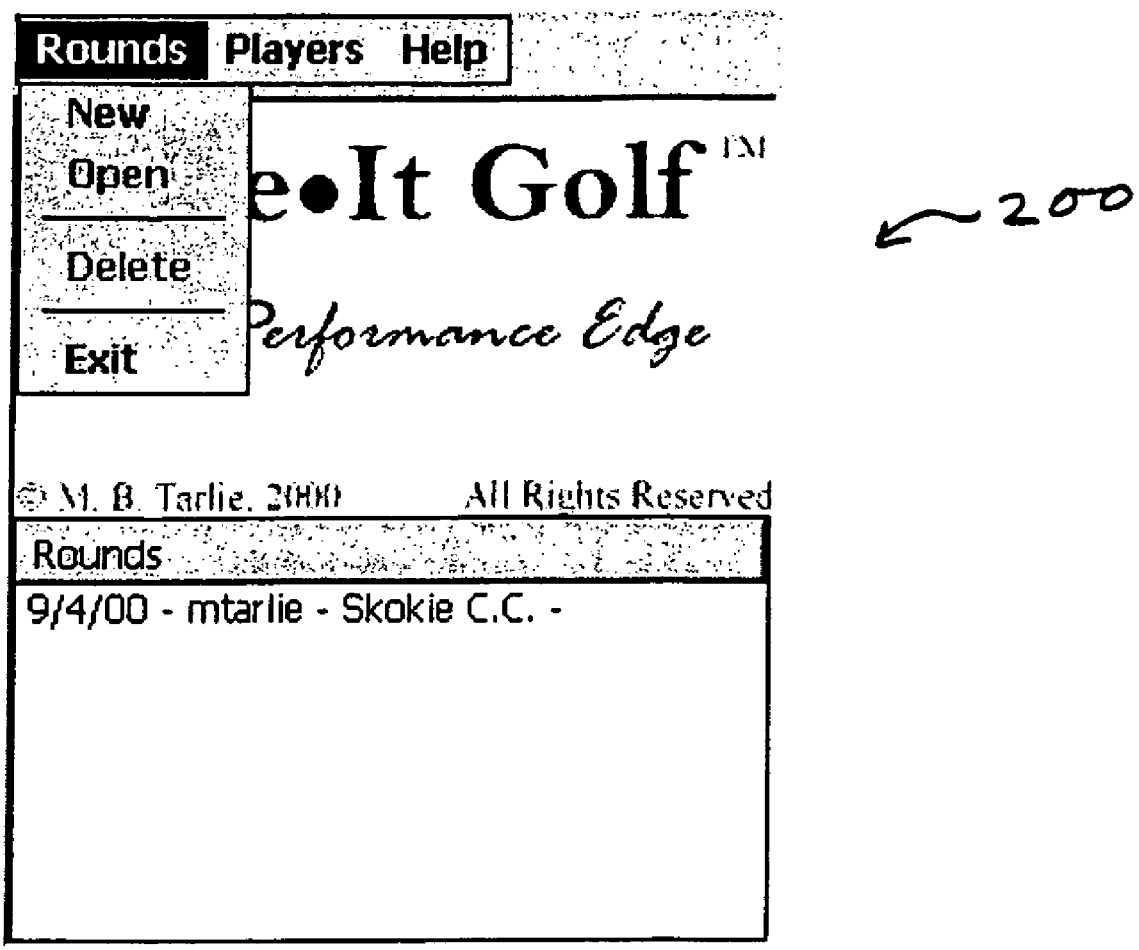
FIG. 3 is a screen shot of an exemplary main screen of a data acquisition component in accordance with one embodiment of the present invention.
Figure 4:
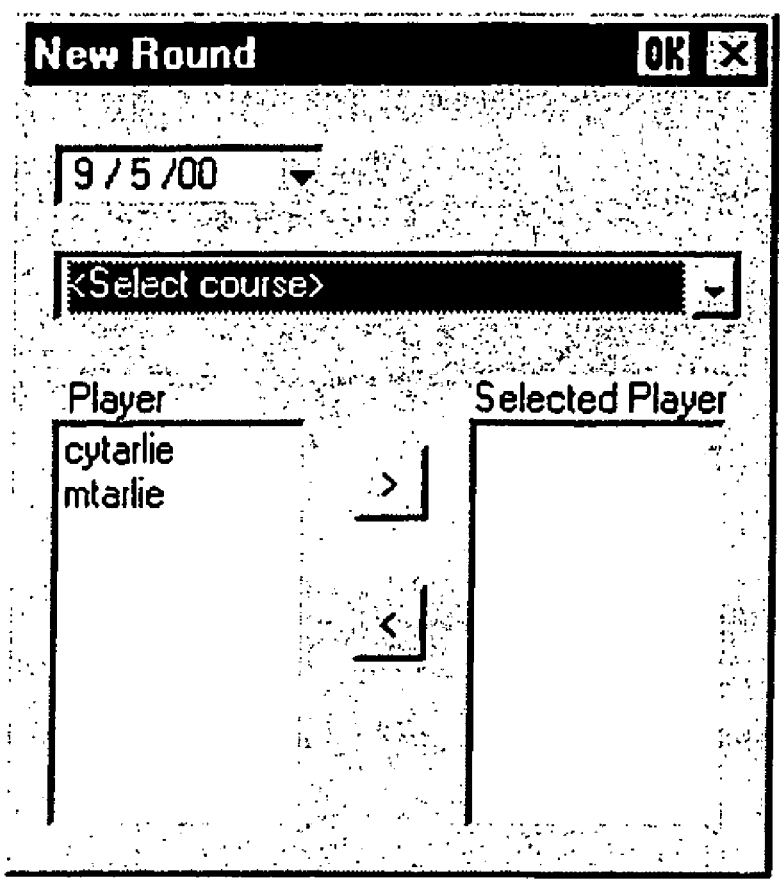
FIG. 4 is a screen shot of an exemplary new round dialog box in accordance with one embodiment of the present invention.

Referring to FIGS. 3 and 4, to record a new round of golf, the user initially selects the NEW ROUND menu item from the main screen 200 of the data acquisition component 12 (see FIG. 3) and then uses the resulting NEW ROUND dialog box 202 (see FIG. 4) to select the date, course, and players. Subsequently, handicap and the tees played can be set for each player individually using the user-interface elements on the Interactive Scorecard 18 (see FIG. 2) as indicated above. In addition, for each player, the tee can preferably be selected for an entire round (using the tee input box 102 on the Interactive Scorecard 18) or for each hole individually (using the tee input box on the Hole Editor—see FIG. 10). In addition to the course, players and date, the data acquisition component 12 can be configured to enable the user to enter more advanced information, including temperature, such as by an additional dialog box accessible from the Interactive Scorecard 18. Users can also freely change the current player using the Interactive Scorecard 18 functionality by simply changing the selection in the player input box 100 (see FIG. 2).

As indicated above, the present invention advantageously enables a user to input and store both hole-level and shot-level information. As used herein, the term "hole-level" refers to information associated with performance characteristics at the level of the hole played, e.g., did the player hit the fairway, did the player hit the green, how many putts did the player take, etc., and the term "shot-level" refers to information associated with the details of every shot that the player hit, e.g. distance to the target, type of shot, lie, club used, difficulty, etc. In accordance with a preferred embodiment, users can enter performance data at the hole-level or at the shot-level using the Hole Summary Editor 20 and the Hole Editor 22, respectively. By default, if both hole and shot-level information are present, then the hole-level information preferably takes precedence. This allows, for example, the user to keep track of his/her score on a hole-by-hole basis and only keep track of certain shots, e.g., drives, putts, etc.

As shown in FIG. 2, the Interactive Scorecard 18 only shows the first nine holes (the "front nine"). To display the second nine holes (the "back nine"), the user simply clicks or taps (depending on whether the input device is a mouse, stylus or other) on the triangle 110 above the "par" label. This layout is particularly useful on handheld devices where screen space is limited. The Interactive Scorecard 18 also preferably includes an AUTOSCORE checkbox 112 which, if checked by the user, will automatically keep track of the player's score. If the user does not wish to automatically keep score (e.g., the user wishes to keep track of only certain shots or does not wish to score each hole), then the user may un-check the box and keep score as desired.

Where more screen space is available, such as in a Web browser on a personal computer, an alternate Interactive Scorecard layout 300 may be implemented, such as shown in FIG. 5. The Interactive Scorecard 300 in FIG. 5 displays information for all holes. In addition to the score, the Interactive Scorecard 300 of FIG. 5 provides other information, including whether the fairway was hit, whether the green was reached in regulation, and the number of putts. The Interactive Scorecard 300 of FIG. 5 also includes a summary box 302 which displays general statistical information which might be of interest to the user.

A. Hole Summary Editor

As indicated below, the Hole Summary Editor 20 allows users to enter information for one or more players at the hole-level. Exemplary properties that may be entered include:

Score

The user enters the total score for the hole.

Fairway hit

The user indicates whether the drive ended up in the fairway (not valid for par 3 holes).

Driving Distance

The user enters the distance of the tee shot (not valid for par 3 holes).

Green in Regulation

The user indicates whether the shot with number par-2 or less was played from the green area of the hole in question.

Number of Putts

The user enters the number of putts required to hole out on a given hole.

Sand Save

If the player is in a green side bunker, the user can indicate whether the player holes out from the bunker in 2 shots or less.

Up and Down

If the player is near the green, the user can indicate whether the player holes out from the shot location near the green in 2 shots or less.

Figure 6:
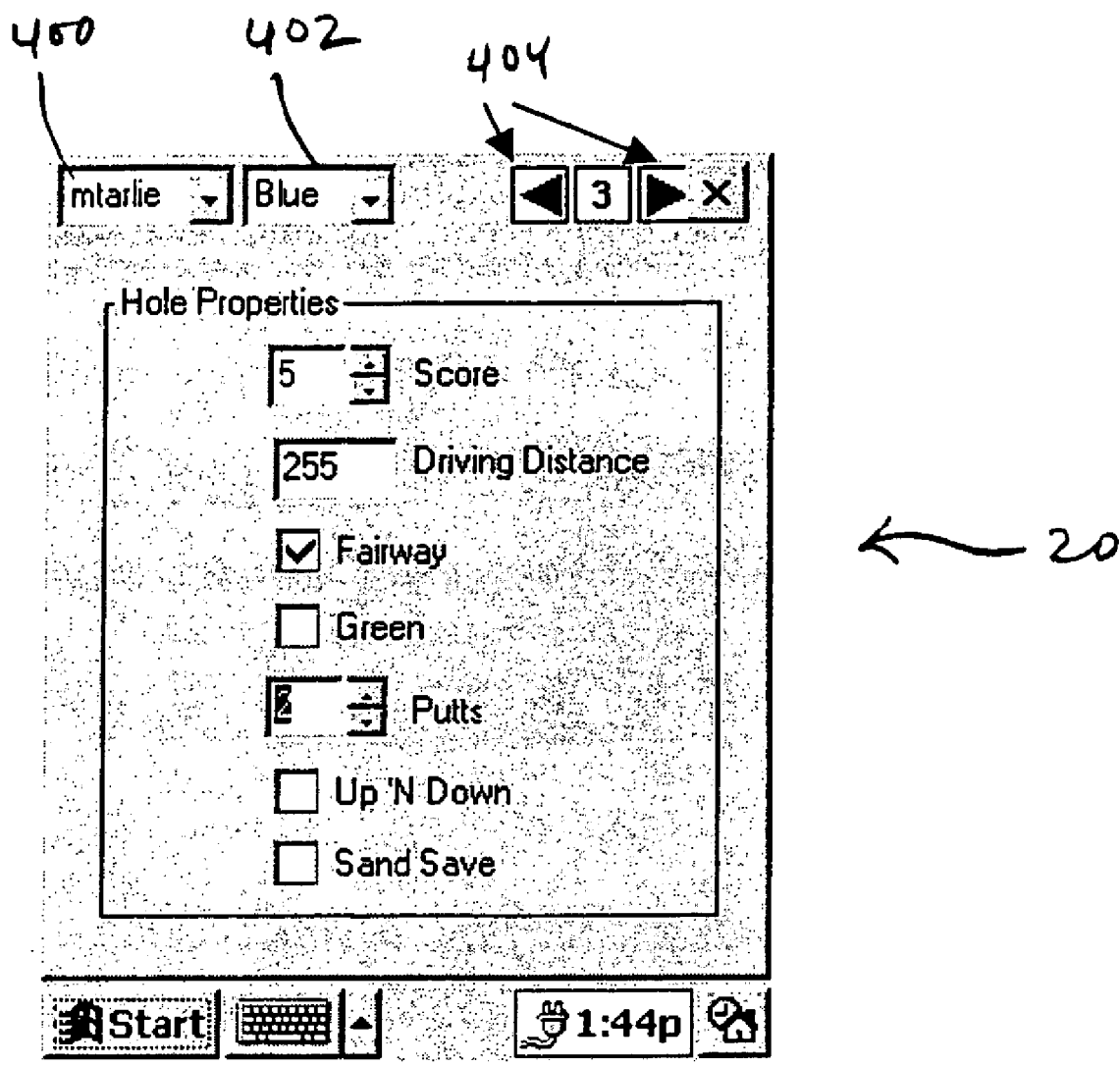
FIG. 6 is a screen shot of a Hole Summary Editor in accordance with one embodiment of the present invention.

A screen shot of one embodiment of the Hole Summary Editor 20 is provided in FIG. 6. In a preferred embodiment, the Hole Summary Editor 20 is activated when the user clicks or taps on the Hole Summary Editor icons 29 (see FIG. 2). The user then uses the standard interface elements provided to enter information related to shots played, driving distance, fairway hit, green hit, up and down, send save, etc. The user can switch to different players and tees by changing the selection in the player and tee input boxes 400, 402. The user can also move to the next (or previous) hole by clicking/tapping on the navigation buttons 404.

B. Hole Editor

Figure 10:
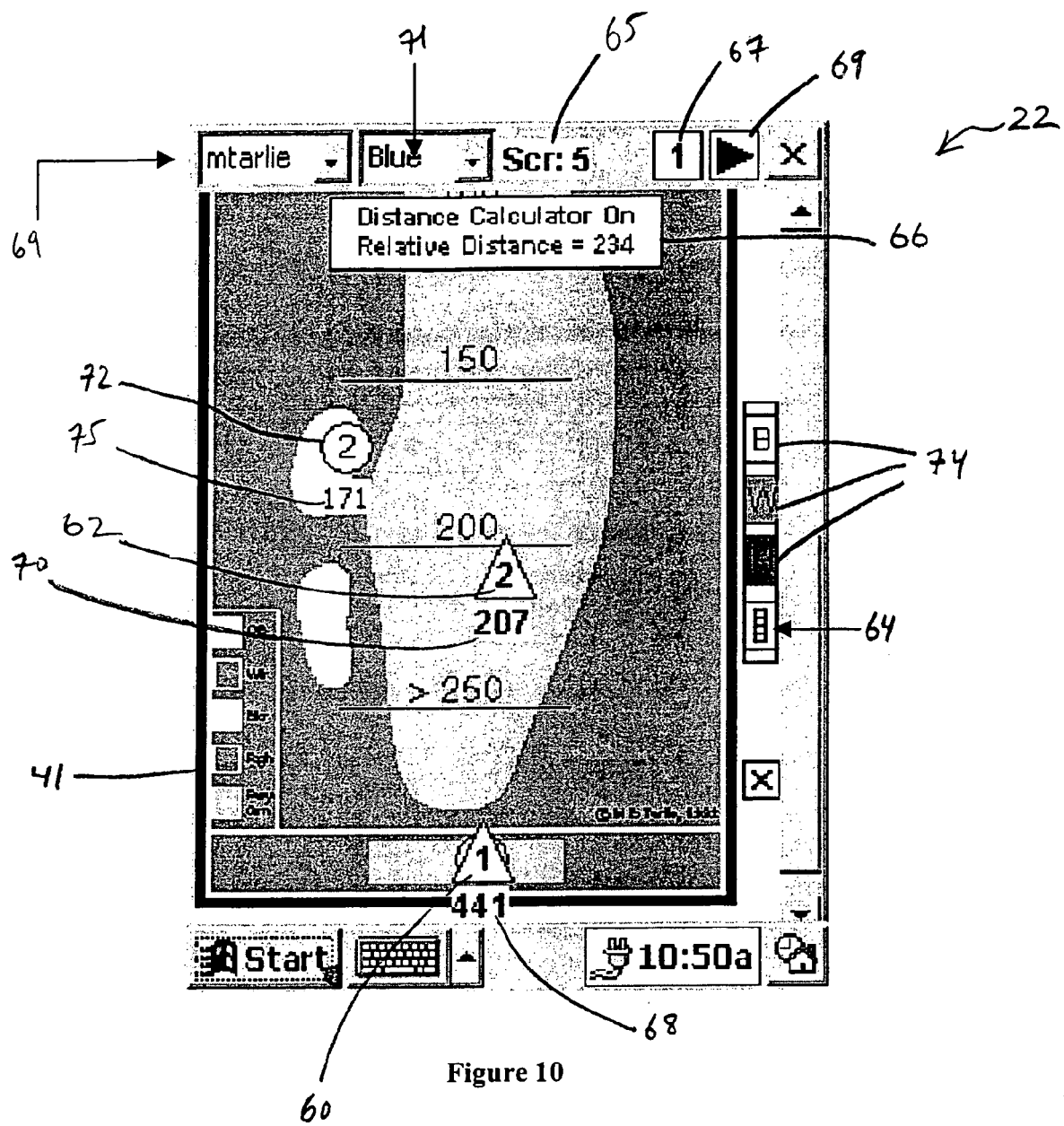
FIG. 10 is a screen shot of a Distance Calculator mode of a Hole Editor in accordance with one embodiment of the present invention.

The Hole Editor 22 allows a user to record a particular player's shots through the green, i.e., non-putts. As indicated above, this is referred to as "shot-level" information. Preferably, the Hole Editor 22 allows the user to change the current player without the user returning to the Interactive Scorecard 18 so that data can be entered for multiple players easily and conveniently, as shown in FIG. 10. In addition, the user can preferably set the tees played on a hole-by-hole basis, thereby overriding the value set at the Interactive Scorecard level.

Referring to FIG. 2, to activate the Hole Editor 22 for a particular hole, the user clicks or taps on the green hole layout icon 30 for that particular hole on the Interactive Scorecard 18. The Hole Editor 22 is then launched, as shown in FIG. 10.

1. Hole Layout Graphics

With the Hole Editor 22, individual shots are recorded by clicking or tapping on hole-specific images in a top-down view of the hole. At least two types of hole-layout graphics may be used in connection with the Hole Editor 22.

In the first type of graphics, referred to as Type I graphics, the hole-layout image contains images for the distinguishing features of the hole, including fairways, bunkers, water, out of bounds, or any other relevant hazards or features. An example of Type I graphics is provided in FIG. 7. As is clear from FIG. 7, each graphic contains color-coded hole representations of all the custom hole features, which may include fairways and greens 32, bunkers 34, out of bounds 36, rough 38, and water 40, all of which are color coded as per a color key 41.

The distance markers (location and value) 42 can vary from one hole to the other and are completely customizable from hole to hole. Also, the location of the Tee and Green sections 46, 54 are also customizable from hole to hole. The ability to vary the position of the Tee and Green sections 46, 54 allows for more realistic representations of certain types of holes, especially doglegs. Hole by hole customization can be accomplished, for example, by storing details of the layout of each hole in the database 816 on the WWW site and then distributing this information on an as-needed basis. For example, when a player using a handheld computer requests to download a course, the course layout information, such as near and far yardage data, and Tee and Green section location information, can also be downloaded. Preferably, the WWW site contains a database of Type I hole images for as many golf courses throughout the world as possible which can be downloaded by users and used to facilitate data entry.

It is also possible to enable the creation of a library of custom course images created by players using the drag and drop techniques described below. These user-defined custom course images can then be stored in the database 816 on the WWW site and made available to other users of the system. A given course can have multiple user-defined custom versions and players desiring custom images for a given course can have the option of choosing the specific version to download. Players may also have the opportunity to rate the quality of the courses which they have downloaded. Different course versions can be ranked by, among other things, number of downloads and player ratings.

Figure 8:
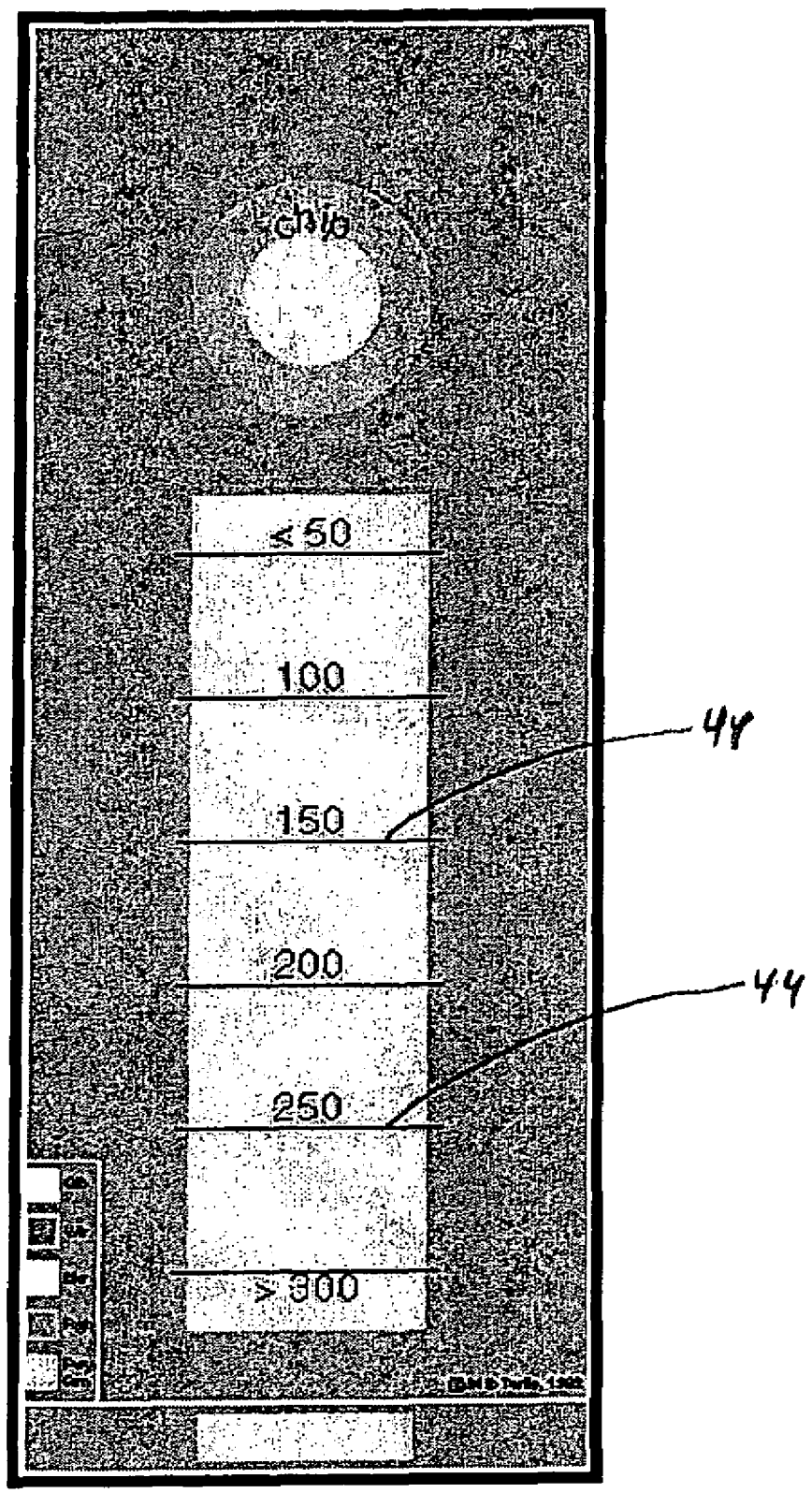
FIG. 8 sets forth an example of Type II Hole Editor graphics in accordance with one embodiment of the present invention.

In the second type of graphics, referred to as Type II graphics, custom images for the hole-specific features are not provided. Instead, a generic fairway is provided, and the bunkers, water, and other hazards are not included in the hole layout image. An example of Type II graphics is provided in FIG. 8. As is evident from FIG. 8, the Type II hole graphic, in contrast to the Type I hole graphic, does not contain custom hole features. Instead, yardage markers 44 are automatically drawn and their location and values are completely customizable by algorithms that determine where to draw the yardage lines based on the length of the hole. In a preferred embodiment, the WWW site will store this information and will be included with the data processing software that is either client or server based. As those of ordinary skill in the art know, there is an available comprehensive, licensable database that contains scorecard information for the vast majority of golf courses in the U.S., including hole length, which can be easily implemented in the WWW site. Alternatively, in the absence of hole length data, the system can be configured to enable the user to set the length of the hole. The distance markers in FIG. 8 are merely exemplary and the values of the distance markers for any given hole will depend on the length of the hole.

Type II graphics will generally be used when Type I graphics for a particular golf course are not available. Type II graphics are thus highly advantageous since they enable the present invention to be used in connection with any golf course in the world regardless of whether custom images are available.

Figure 9:
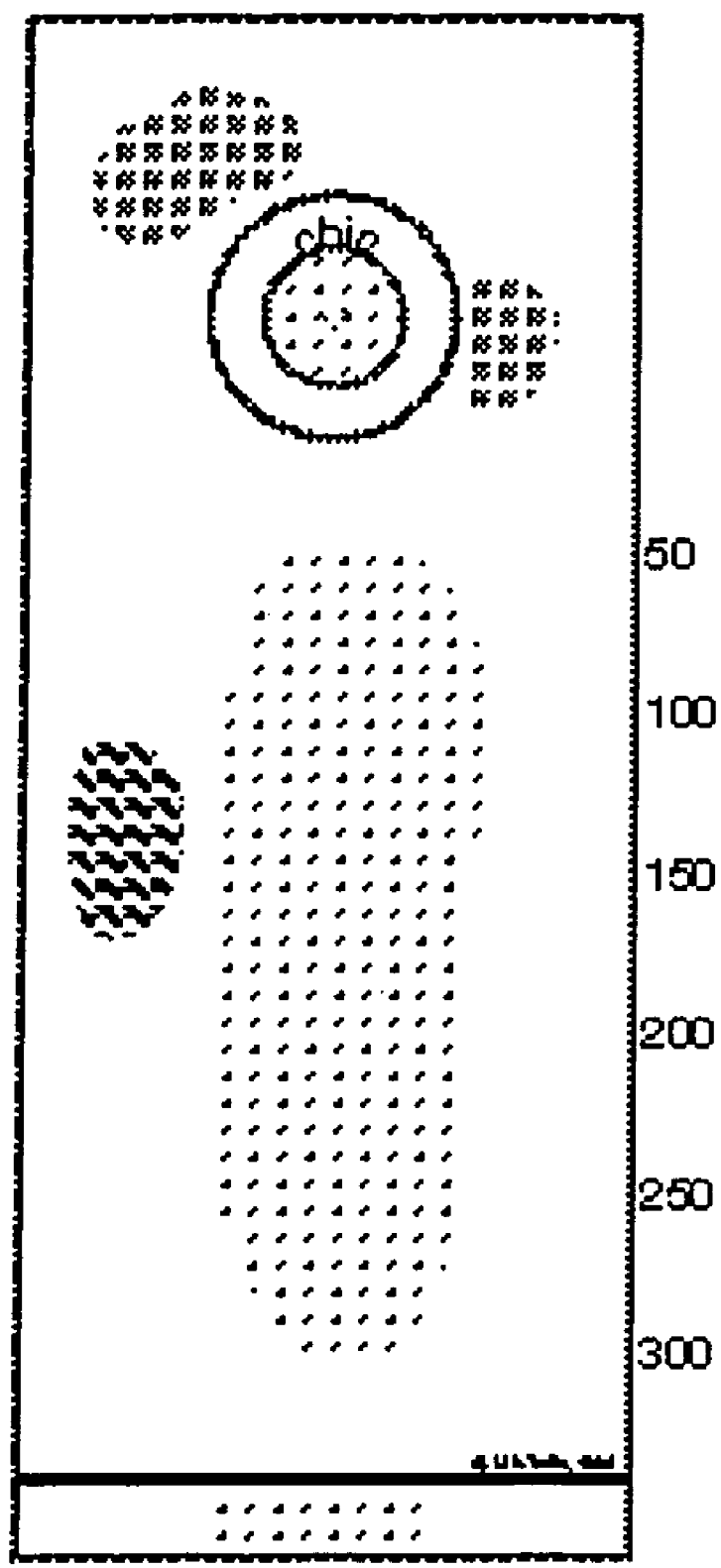
FIG. 9 sets forth an example of black and white Hole Editor graphics in accordance with one embodiment of the present invention.

The present invention can also be used with monochrome displays, e.g., black & white PalmPilot screens. In that situation, the different hole features can be distinguished by the user based on pattern rather than color, as shown in FIG. 9.

2. Graphic Sections

Referring again to FIG. 7, both Type I and Type II graphics are preferably divided into five primary shot related sections: Tee 46, Approach 48, Pitch 50, Chip 52 and Green 54. The specific layouts of these sections are relative to one another and can vary from hole to hole. The system architecture is flexible so that for each hole the parameters defining the layout are read from the database and used to process the shot information in the appropriate context. In a preferred embodiment, the hole layout information is stored in the database 816 on the WWW site and the hole-specific information is downloaded (and possibly stored on the user's computer) on an as-needed basis, although it can be stored in a database on the user's computer as well.

When a user clicks or taps on a section other than the Green 54 in the Hole Editor 22, a new shot "through the green" (i.e., non-putts) is added. A detailed discussion of adding shots in these sections is provided below. To add shots on the green (i.e., putts), the Putt Editor 24 is used as described in detail below.

3. Distance Markers

Figure 7:
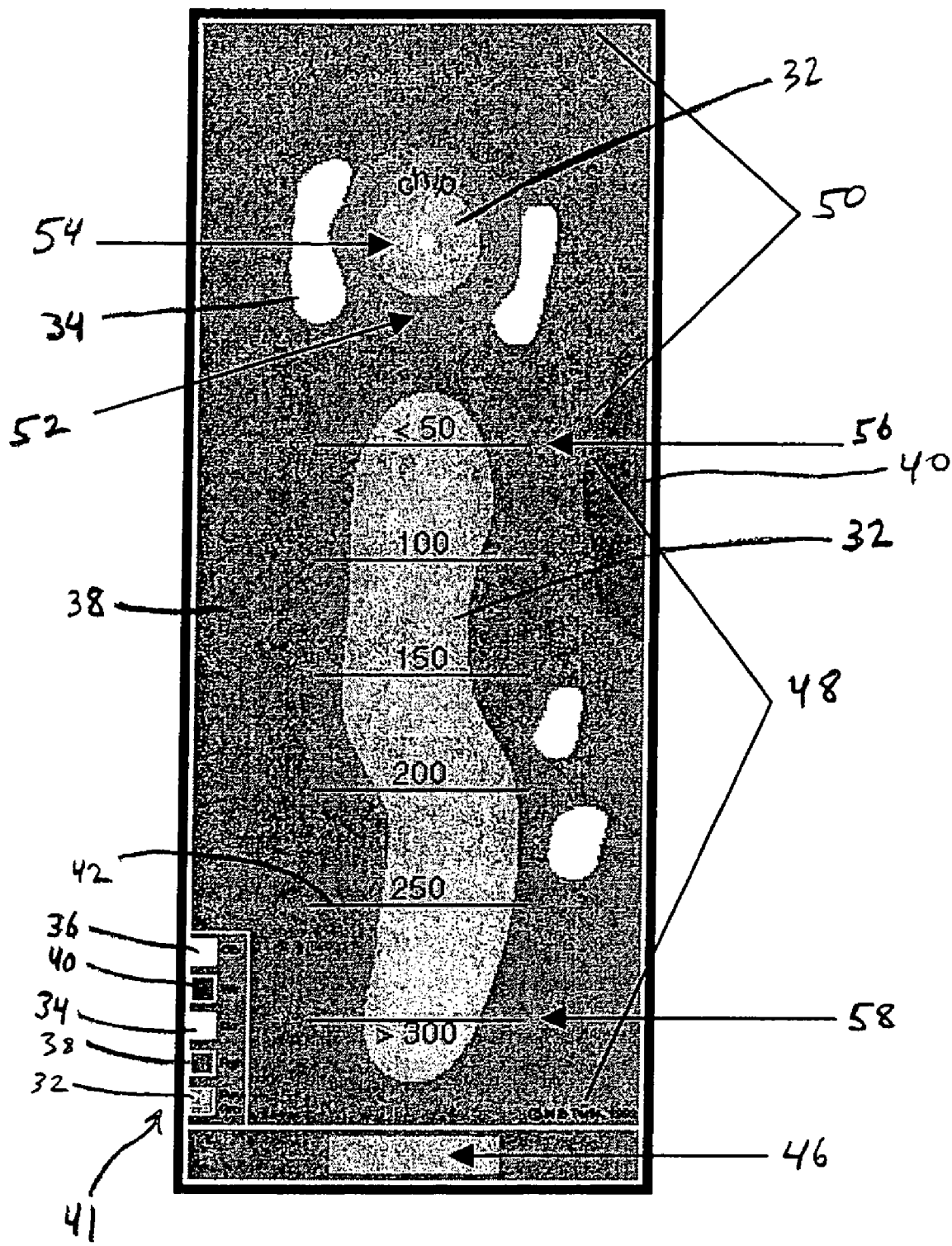
FIG. 7 sets forth an example of Type I Hole Editor graphics in accordance with one embodiment of the present invention.

As is clear from FIGS. 7 and 8, both Type I and Type II hole graphics present the user with distance markers. These are graphical features on the hole layout that indicate the distance to the center of the green. The location of the distance markers on the graphic and the distance values (e.g., 50 yards, 100 yards, etc.) are customizable by specifying the hole layout information in the database (see the Hole Layout Graphics Section above) and can vary from hole to hole.

Referring again to FIG. 7, the distance marker closest to the center of the Green 54 (the near distance marker) 56 defines the border between the Pitch 50 and Approach 48 sections. The location of this marker and the associated distance value can vary from hole to hole. The precise distance to the center of the green for shots within the Pitch section 50 is preferably not automatically calculated. Instead, a distance range is automatically calculated. For example, if the near-distance value is 50 yards, then the system automatically assigns a distance range of 0–50 yards to the shot. If the user desires, the user can specify a precise distance value that overrides the automatically calculated value using the dialog editor discussed below. For shots located between the near- and far-distance markers 56, 58 the precise shot distance to the center of the green is preferably calculated using a linear or other scale.

The location and value of the distance marker furthest from the center of the green (the far distance marker) 58 can also vary from hole to hole. The precise distance to the hole is preferably not automatically calculated for shots that lie between the Tee section 46 and the furthest distance marker 58. Instead, a distance range is automatically calculated. For example, if the far-distance is 250 yards and the hole-length is 350 yards, then the system automatically assigns a distance range of 250–300 yards to the shot. If the user desires, the user can specify a precise distance value that overrides the automatically calculated value using the dialog editor.

This architecture is very flexible and does not impose any constraint on the system's ability to provide adequate distance resolution. Thus, for example, the far-distance marker 58 can be located in the Tee section 46 with an associated distance value that is equal to the length of the hole. However, the benefit of locating the far-distance marker 58 closer to the hole with a distance value less than the length of the hole is that greater distance resolution can be obtained for those distances between the far- and near-distance values. This allows the system to provide the greatest resolution in the regions that are of most value for purposes of usability and obtaining the most useful information. Alternatives to this method either imply lower distance resolution or larger images, both of which negatively impact ease of use.

The system preferably determines the locations and values of the distance markers for Type II graphics based on the length of the hole. For example, if the hole is short, for example less than 200 yards, then the data acquisition component may set the far distance value to be, for example, 150 yards, and draw the 100 and 50 yard markers. On the other hand, if the hole is long, for example greater than 500 yards, then the system may set the far distance value to be, for example, 300 yards, and draw the remaining markers at 50 yard intervals, spaced evenly until reaching the near distance marker with value of 50 yards.

In a preferred embodiment, the location (as opposed to value) of the near and far distance markers is the same for each hole. This simplifies the internal algorithms but is a condition that can be removed, as those of ordinary skill in the art will appreciate.

4. Distance Calculator

In the handheld computer embodiment, the Hole Editor 22 can preferably operate in at least two modes. One of these modes is the Distance Calculator mode. As can be appreciated, this mode is only useful when Type I (i.e., custom) graphics are available. A screenshot of the Distance Calculator mode of the Hole Editor 22 in accordance with one embodiment of the present invention is provided in FIG. 10. When the Distance Calculator is activated, two icons 60, 62 (distinct from the shot icons) appear. Each icon displays its distance to the green, and a message on the screen displays the relative distance between the two icons. The user can drag each distance calculator icon around the screen and the icon distance and relative distance are automatically updated. This allows the user to quickly and easily determine the precise distance from a given point to the center of the green as well as the relative distance between two arbitrary points on the hole layout. This can be very valuable for golfers who input data during a golf round, especially when playing an unfamiliar course.

Referring to FIG. 10, the Distance Calculator is activated by clicking or tapping on the ruler icon 64 on the side of the screen. The two triangular icons 60, 62 (labeled "1" and "2") can be dragged around and the banner at the top of the screen 66 will update to show the relative distance between the two icons 60, 62. In addition, the captions 68, 70 below the two icons display the distance of each icon to the center of the green.

Those of ordinary skill in the art will appreciate that the Distance Calculator can be similarly implemented for the WWW browser embodiment, although the Distance Calculator in that situation will likely have limited utility since in most cases data will be entered after the golf round has been played.

5. Recording Shot Data

To record shots using the Hole Editor 22, the Shot Recording mode is used. When Shot Recording is activated, those shots played on the course that do not include the greens are recorded by clicking or tapping on any section of the hole layout graphic except the Green section. Putts are added by using the Putt Editor 24 and will be discussed in detail below.

As shown in FIG. 10, the Hole Editor 22 preferably includes input boxes 69, 71 to enable the user to set the player and tees, as well as a box 63 which indicates the player's score, a box 65 which indicates the hole being played, and an arrow 67 which allows the user to change holes.

Figure 11:
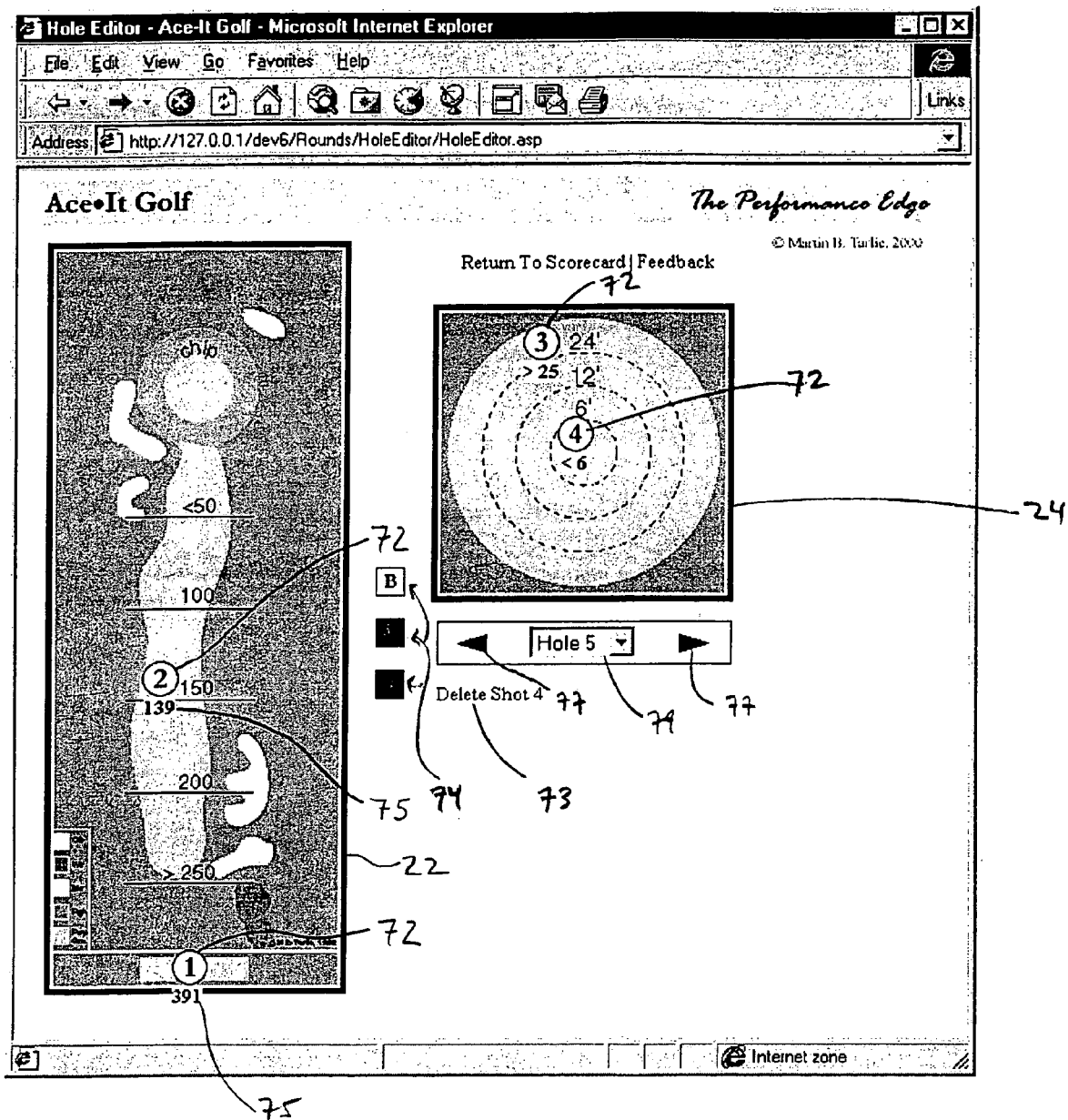
FIG. 11 is a screen shot of a WWW browser-implemented Hole Editor with Type I graphics and a Putt Editor in accordance with one embodiment of the present invention.
Figure 12:
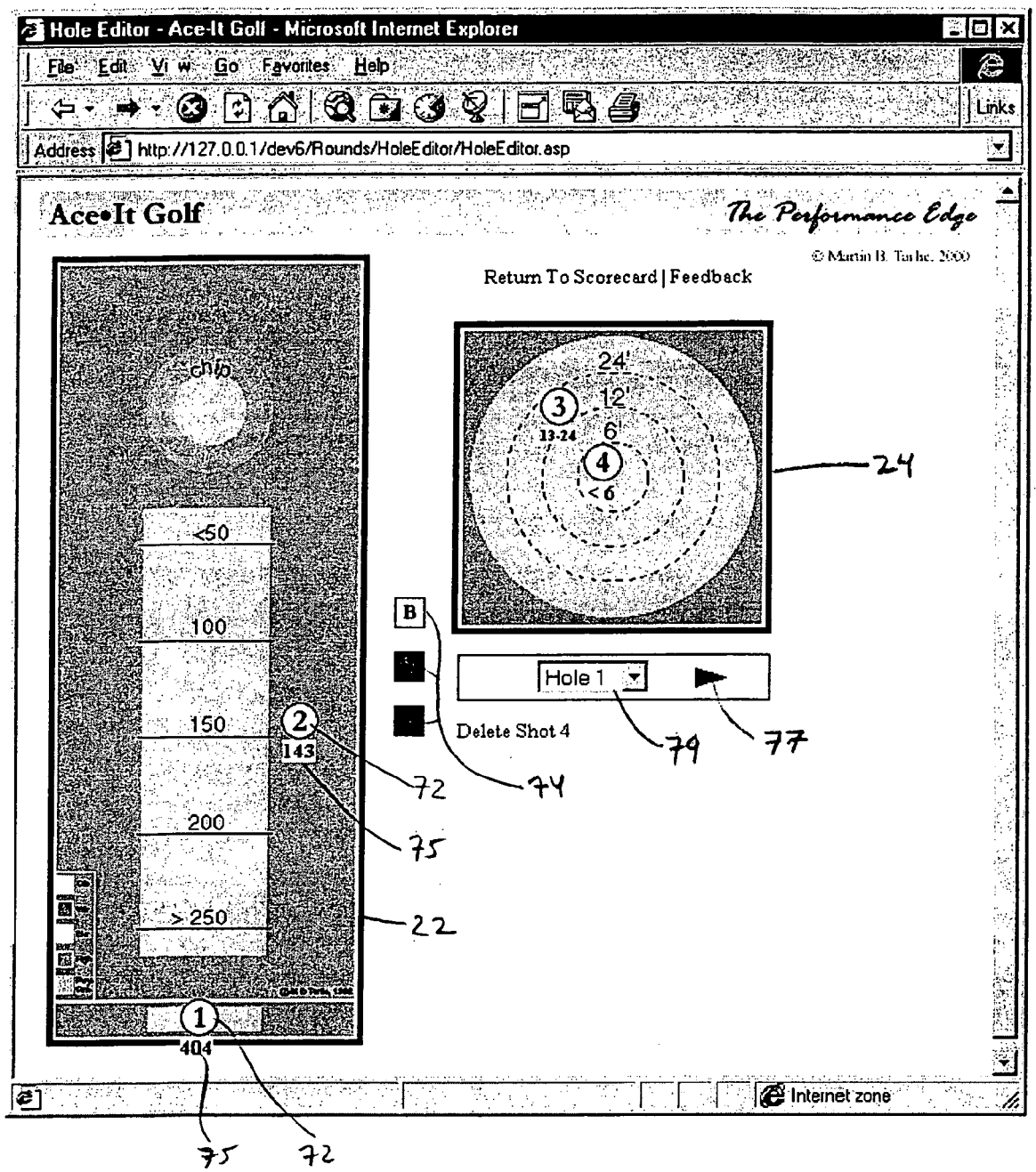
FIG. 12 is a screen shot of a WWW browser-implemented Hole Editor with Type II graphics and a Putt Editor in accordance with one embodiment of the present invention.
Figure 13A:
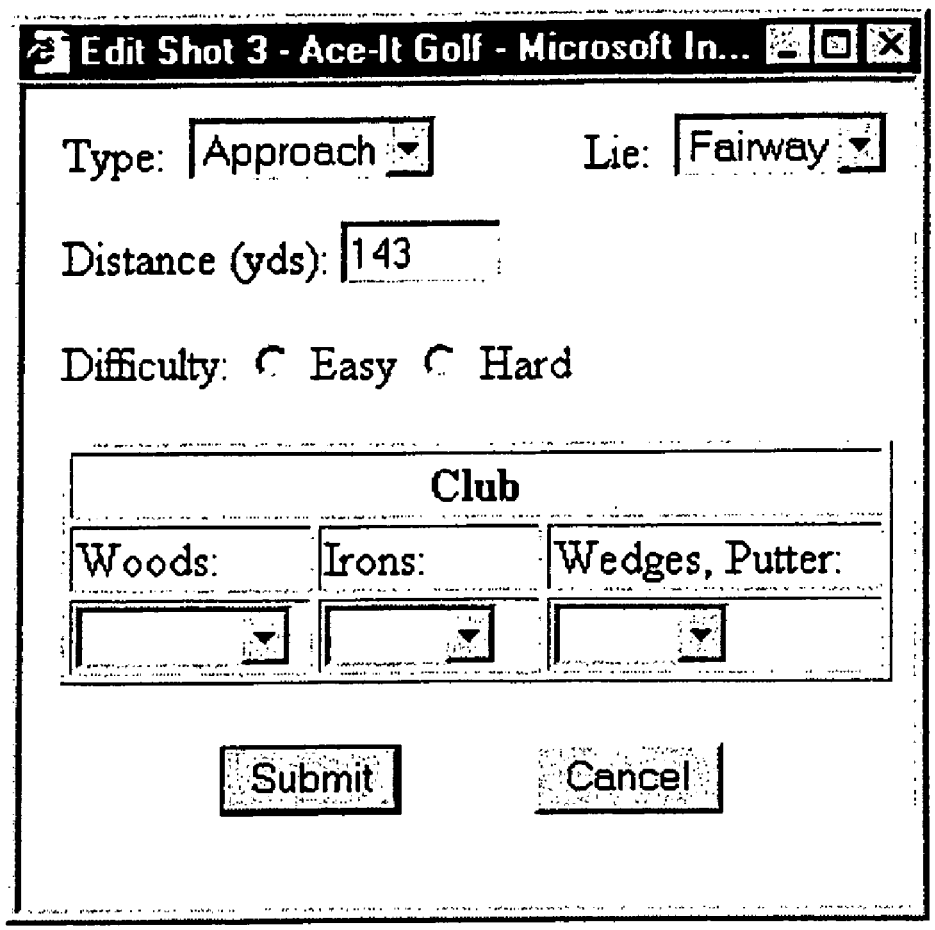
FIG. 13a is a screen shot of a dialog box for editing shot properties in the Hole Editor for an Approach section for a WWW browser in accordance with one embodiment of the present invention.
Figure 13B:
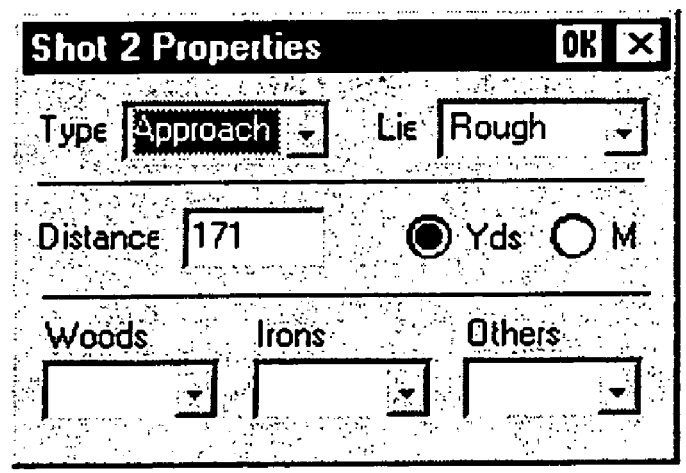
FIG. 13b is a screen shot of a dialog box for editing shot properties in the Hole Editor for an Approach section for a handheld computer in accordance with one embodiment of the present invention.
Figure 14A:
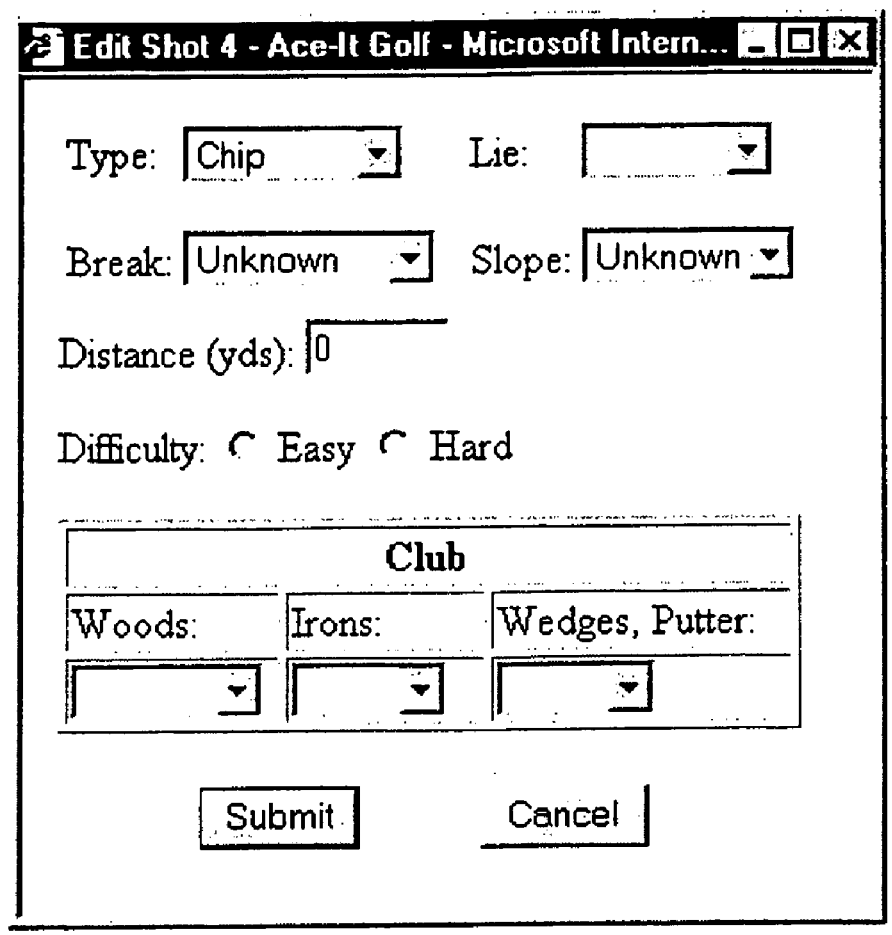
FIG. 14a is a screen shot of a dialog box for editing shot properties in the Hole Editor for a Chip section for a WWW browser in accordance with one embodiment of the present invention.
Figure 14B:
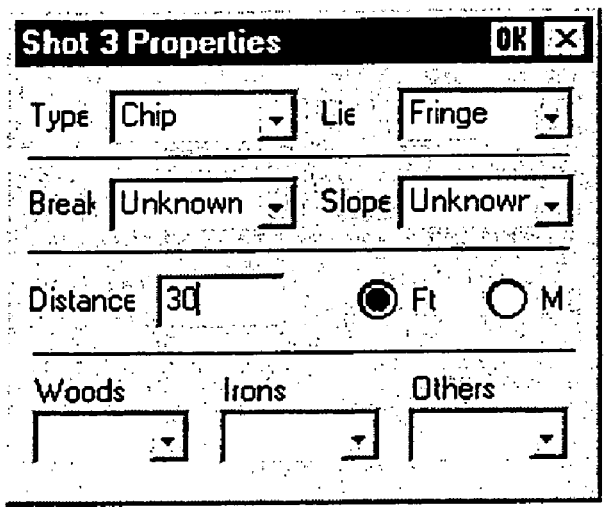
FIG. 14b is a screen shot of a dialog box for editing shot properties in the Hole Editor for a Chip section for a handheld computer in accordance with one embodiment of the present invention.

Referring to FIGS. 11 and 12, which show the Hole Editor 22 and the Putt Editor 24 next to one another in the WWW browser embodiment, after clicking (or tapping) on a specific point on the hole layout graphic that corresponds to the origin of the shot, an icon 72 appears for that shot. In addition, certain "primary" shot properties (described in detail below) are preferably automatically calculated by the system. This is of tremendous value to the user because every shot and its primary properties can be recorded with a single click (or tap).

In a preferred embodiment, the shot number appears in the icon 72 indicating the sequence of shots played (see below for a more detailed description). The shot number is automatically calculated by adding one to the number of shots in the sequence prior to the click or tap. In addition to the shot number, other shot properties may be visually indicated as well, if desired. The distance from the green for each shot 75 is also shown.

In a preferred embodiment, any shot icon 72 can be dragged from one position to another. If the user is using a mouse, simply clicking on the icon 72, holding the mouse button down, and moving the cursor will cause the icon 72 to move. This is a "drag" operation. When the mouse button is released the icon 72 is "dropped" and the primary properties (described below) are automatically recalculated. If the user is using a device with a touch screen, then simply tapping on a shot icon and moving the stylus while maintaining pressure will "drag" the icon 72 across the screen. Releasing the stylus will cause the icon 72 to be "dropped" and the primary shot properties recalculated.

Shots are deleted by clicking on the DELETE SHOT button 73. In a preferred embodiment, only the last shot in the shot sequence can be deleted. The advantage of this is that it prevents the user from entering shots that are out of sequence and thus assists in maintaining the integrity of the data. Alternatively, the icon of the last shot can be provided with an "X" button or the like which can be clicked to delete the shot. Thus, all shots can be deleted, although the deletion must occur in reverse numerical order. For convenience, the user may also be provided with means to delete every shot for a given hole with a single click if desired.

To move to another hole, either the hole arrows 77 or the hole drop down menu 79 can be used.

6. Shot Properties

For each shot, the exemplary properties listed below can preferably be recorded. These properties fall into one of two categories: (i) primary and (ii) secondary. Primary properties are automatically calculated by the system when a new shot icon is created or when an existing icon is moved (the drag/drop operation described above). Secondary properties need to be manually entered by the user.

The primary/secondary classification can depend on the type (I or II) of hole layout graphic. For example, for Type I graphics, any shot lie can be automatically calculated since custom hole features are present. However, for Type II graphics, the automatically calculated lie values may not include any hole specific hazards such as bunkers or water.

In a preferred embodiment, secondary properties are edited either by dragging certain "property" icons and dropping them on the appropriate shot icon or by activating a dialog editor by clicking (or tapping) on an existing shot icon. The dialog editor, which pops up on the screen, may be generic or, preferably, shot-kind specific. Examples of the dialog editor based method of editing shot properties for the Approach and Chip sections for both WWW browser and handheld embodiments are shown in FIGS. 13a, 13b, 14a and 14c. The types of properties that are relevant can depend on the kind of shot (e.g., Tee, Approach, Pitch, Chip, Putt), so the editor is customized depending on the shot type. The user can also preferably manually alter primary properties, thereby overriding the values that were automatically calculated by the system.

To account for the lack of hole specific hazard information for Type II graphics, the user can preferably override the automatic lie calculation, which for Type II graphics is limited to Tee, Fairway, and Rough. With reference to FIG. 12, this is accomplished by dragging a lie icon 74 (see FIG. 10) and dropping it on the shot icon 72 or by clicking (or tapping) on the shot icon 72 and using the resulting dialog editor box to manually set the value. The lie icons 74 are contained in the Hole Editor 22 and the user simply drags a particular lie icon 74 over the shot icon 72 and drops it on top of the shot icon 72. The dropping of the lie icon 74 will set the shot lie property to coincide with the lie icon's associated lie value. These shot lie icons are shown in FIG. 12 and illustratively include a bunker icon "B", a hazard icon "H" and a water icon "W". Those of ordinary skill in the art will appreciate that this drag and drop method of setting the shot lie described can also be applied to other shot properties as well and is not limited to shot lie. For example, the user can set the wind property by dragging an appropriate wind icon and dropping it on a given shot icon.

The following is a non-exhaustive list of exemplary shot properties which may be used in accordance with the present invention and a description of each:

a. Shot Number

As indicated above, for each shot played, an icon 72 with a Shot Number indicates the origin of the shot. For example, for every hole played, the Tee Section will contain an icon with the number "1", indicating the first shot played. Each additional shot is recorded by the user by simply clicking or tapping on the hole layout at the origin of the shot. The system preferably automatically increments the shot number each time the user adds a new shot so that the user is freed from manually adding this information. In other words, the shot number is determined by adding one to the number of shots in the sequence just prior to the addition of the new shot. As discussed above, users can also delete shots.

b. Shot Location

The precise location of the shot on the graphic is automatically determined.

c. Shot Kind

The Shot Kind property can assume one of at least six values: Tee, Approach, Chip, Pitch, Putt, Layup, Recovery or Penalty. For both Type I and Type II graphics, the Tee, Approach, Chip, Pitch, and Putt values are automatically determined based on the location of the shot.

The Penalty value can be determined automatically if the lie of the shot is water or out of bounds, but in general it must be edited manually using either the drag/drop feature or the dialog editor.

d. Shot Region

Figure 15:
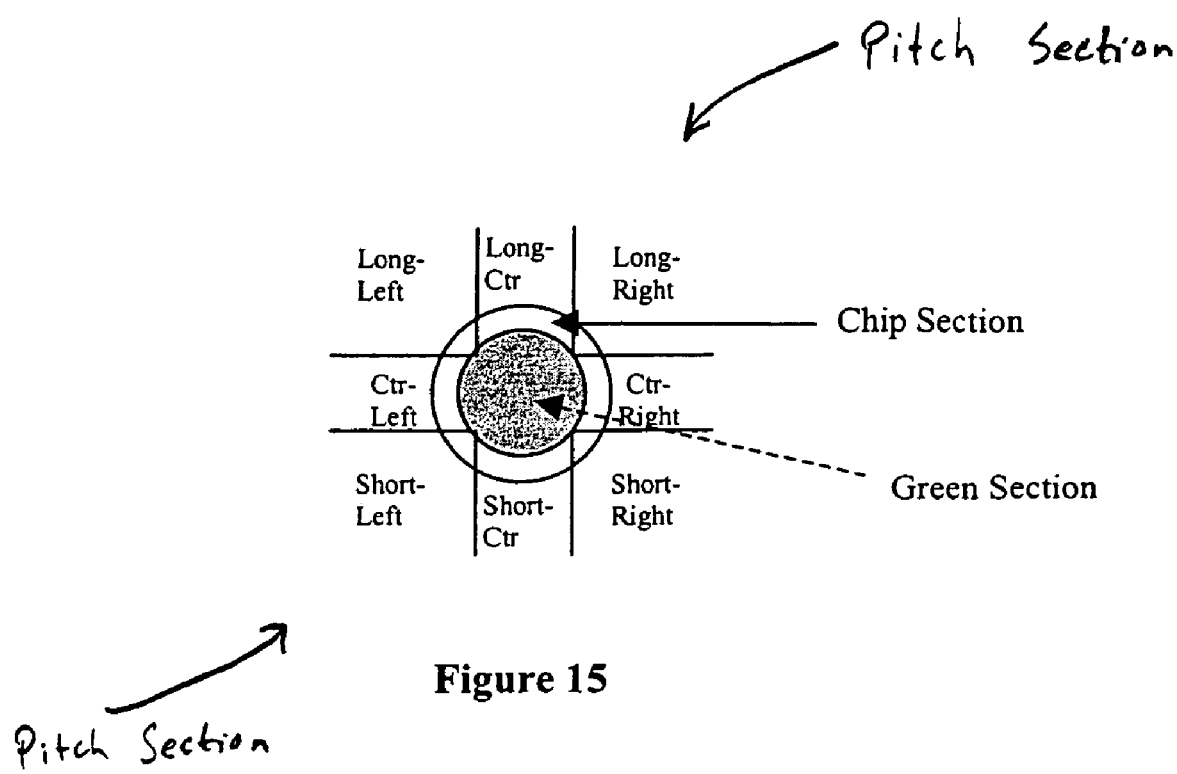
FIG. 15 is a diagram of Pitch and Chip sections in accordance with one embodiment of the present invention.

The Shot Region property depends on the kind of shot. With a tee shot, the shot region is not relevant. With an approach shot, the system preferably automatically records whether or not the shot is located in the fairway, left of the fairway, or right of the fairway. For pitch and chip shots, the Pitch and Chip sections 50, 52 are divided into 8 regions as show in FIG. 15. In FIG. 15, the Pitch section is the area surrounding the Chip section. The system preferably automatically records the region in which a given Pitch or Chip shot resides.

e. Shot Region Position

The Shot Region Position (SRP) property characterizes the relative (horizontal) position of a shot within a given Shot Region. The domain for this property is a real number between 0 and 1, inclusive. A shot located at the extreme left of the given Shot Region will have a value of 0, and a shot located at the extreme right of the given Shot Region will have a value of 1. This property can be important because it provides a mechanism for normalizing shot data played on different courses and holes, each of which can have Shot Regions of varying geometric dimensions. This property is only relevant for Approach, Pitch and Chip shots. The SRP is determined in the following manner:

Approach Shots:

If the Shot Region is Fairway then $SRP$=(Horizontal Shot Position−Position of Left Edge of Fairway)/Fairway Width If the Shot Region is Right then $SRP$=(Horizontal Shot Position−Position of Right Edge of Fairway)/(Position of Right Edge of the Hole−Position of Right Edge of Fairway)

If the Shot Region is Left then $SRP$=(Position of Left Edge of the Hole−Horizontal Shot Position)/(Position of Left Edge of Fairway−Position of Left Edge of the Hole)

Pitch & Chip Shots:

$SRP$=(Horizontal Shot Position−Position of Left Edge of Hole)/Hole Width f. Distance Range With both Type I and Type II graphics, yardage markers that indicate the distance from a given point on the layout to the center of the green are shown. For a more detailed description, see the Distance Markers section above.

g. Shot Lie

In a preferred embodiment, the possible lie values are Tee, Fairway, Rough, Bunker, Water, Hazard, Out-of-Bounds. The determination of the lie depends on the type of graphic. For Type I graphics, the lie can be automatically determined by the background color or location of the click or tap.

For Type II graphics, if the lie is Tee, Fairway, or Rough, the lie can be automatically determined by the background color or click/tap location as well. However, because this graphic type does not contain any hazard (bunker, water, etc.) information, the user is also presented with lie icons 74 that represent bunker, water, or a generic hazard. The user can then drag an icon and drop it on the shot in question, as discussed in greater detail above. This will set the lie of the shot to the value corresponding to the dropped icon.

In addition, the system can preferably store a given user's drag/drop operations with respect to the Shot Lie. This allows a user to incrementally and dynamically modify the generic Type II graphic into his/her own personalized Type I graphic which will contain the custom features for a specific hole. The benefit of this is that the user is not required to invest the time and effort to build the hole features before play. Rather, the system can be configured to remember the user's actions and store this information in the WWW site database 816 or on the user's computer for later use. In addition, the system preferably includes mechanisms that allow users to share their customized courses with others, as discussed above.

If the user so desires, he/she can also dynamically create his/her own personalized Type II graphics without being in Shot Recording Mode. In other words, by using the drag/drop technique a user can build up the custom features of the hole all at once.

h. Lie Condition

The user can specify the condition of the lie. Possible values include (but are not limited to) Good, Bare, Fluffy, Ball Sitting Down, Ball Sitting Up, Divot.

i. Club Used

The user can specify the club used for a particular shot played. In a preferred embodiment, when the user clicks (or taps) on an existing shot icon, a shot editor dialog box appears that allows the user to edit specific properties of the shot, including the club used.

The system will preferably allow the user to set the manufacturer, brand, model, etc. for a round or set of rounds for the different clubs in the player's bag. These global settings are a convenience for the player and in no way preclude the user from modifying the club information on a shot-by-shot basis. The goal is to provide the user with a simple, user-friendly system that requires the minimum of data input and simultaneously maximizes the power and flexibility of the system.

The club information can include club type ([metal]wood, iron), club number (1–9), PW, SW, GW, Putter, and/or particular manufacturers, brands, and models.

j. Grass Type

The user can specify the type of grass through the green and on the green. For more advanced players this can be very valuable information as certain types of grasses can significantly affect certain players performance.

k. Wind

The user can specify the wind speed and direction for each shot. For convenience, the user can specify the wind speed and direction at either the round or hole-level. If the wind happens to change, then the user can modify the values for each particular shot.

l. Stance

The user can specify the stance for the particular shot. Possible values include Sidehill-ball below feet, Sidehill-ball above feet, Uphill, Downhill.

m. Ball Used

The user can specify the ball used for a particular shot played. This allows golfers to experiment with different balls during the course of a practice round and also compare performance on a round-by-round basis.

n. Initial Shot Direction

The user can indicate the initial direction of the shot (e.g., straight, right, left). In a preferred embodiment, the user can draw an arc connecting two shots to indicate both the initial shot direction and the shape of the shot (see below).

o. Shot Shape

The user can indicate the shape of the shot (e.g., straight, draw, fade). In a preferred embodiment, the user can draw an arc connecting two shots to indicate both the initial shot direction and the shape of the shot.

p. Strike Quality

The user can indicate whether or not the ball was struck well, or mishit (e.g., "thin" or "fat"), and where on the club the ball struck (e.g., center, toe, or heel).

q. Target Level

The user can indicate if the target of the shot is uphill, downhill, or at the same level as the origin of the shot.

r. Notes

The user can record notes (in the form of text) for each shot.

s. Shot Difficulty

The user can record the difficulty of each shot. In a preferred embodiment the values are Easy, Hard, and Unknown. This information is valuable because it indicates the player's performance for shots that lead to the shot of interest. For example, if a player finds he/she has many Hard chip shots, that indicates that he/she needs to examine his/her Approach shots.

The foregoing discussion of shot properties was for illustrative purposes. Those of ordinary skill in the art will appreciate that the present invention is not limited to the exemplary shot properties discussed above, nor does the present invention necessarily require use of any or all of the specific shot properties discussed above.

C. Putt Editor

The Putt Editor 24 is used to record shots on the green, i.e., putts. The putts are recorded by clicking (or tapping) on a generic graphic that represents a top-down view of the green. The graphic, shown in FIGS. 11, 12, 16a and 16b, is circular and specifically designed to facilitate recording of the position of the ball relative to the pin and a distance range for the putt. For the purposes of recording putt performance, it is not necessary to provide the user with a graphic representing the true shape of the green. However, the Pin Location Editor 26 described below uses the true shape of the green to allow the user to indicate the particular location of the hole if desired.

1. Green Distance Markers

Figure 16A:
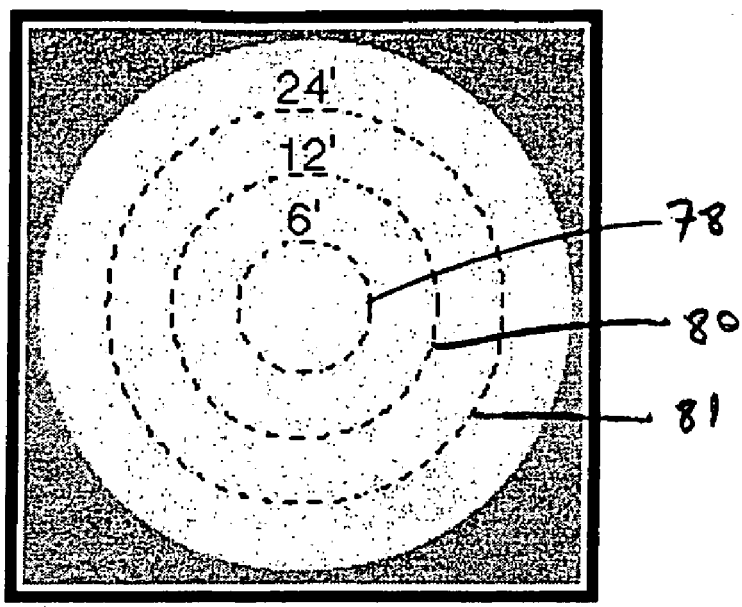
FIG. 16a is a Putt Editor layout in accordance with one embodiment of the present invention.
Figure 16B:
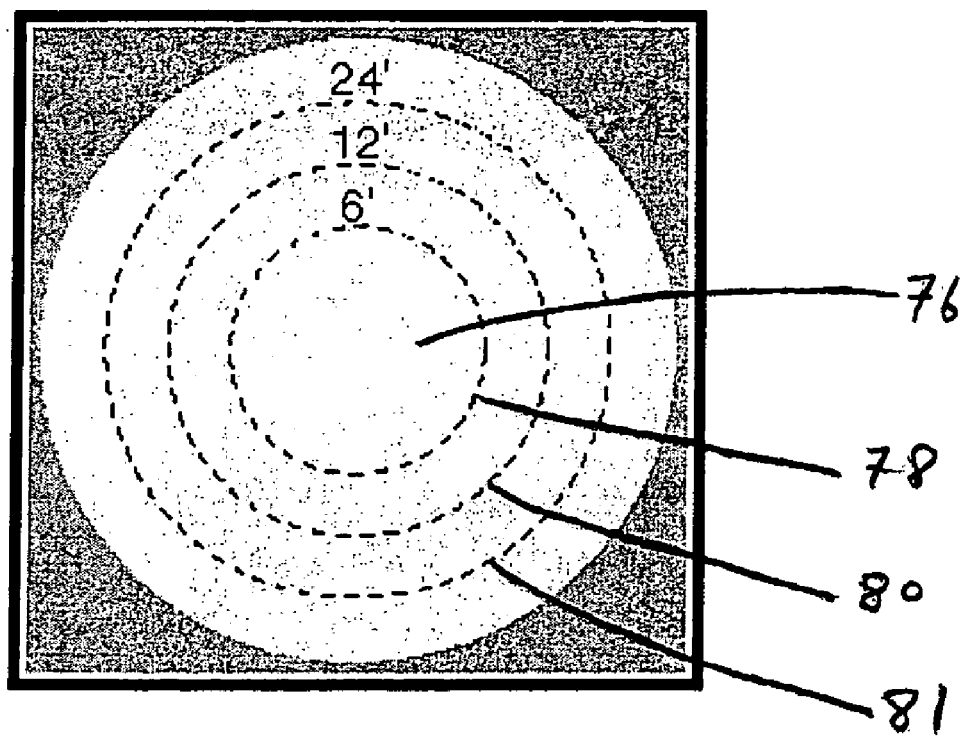
FIG. 16b is an alternate Putt Editor layout in accordance with one embodiment of the present invention.

Referring to FIGS. 16a and 16b, the circular green is visibly divided into different regions by circular distance markers 76, 78, 80, and 81. In a preferred embodiment, shown in FIG. 16b, four radii are painted on the green indicating the distances of 3 feet, 6 feet, 12 feet, and 24 feet. This creates five distinct distance regions: 0–3 feet, 4–6 feet, 7–12 feet, 13–24 feet, and greater than 24 feet.

2. Recording Putts

New putts are added by simply clicking (or tapping) on a given point on the generic green graphic in a manner identical to the way new shots are added using the Hole Editor 22. For each putt, the non-exhaustive exemplary properties listed below may be recorded.

a. Shot Number

This works the same as that for the Hole Editor 22. The user adds a new putt by simply clicking (or tapping) on the point that corresponds to the origin of the putt. The shot number is determined by adding 1 to the most recent shot added for the particular hole. The last shot in the sequence can be deleted as discussed above.

b. Shot Location

The precise location of the shot on the graphic is automatically determined.

c. Shot Kind

The shot kind is automatically set to "Putt".

d. Shot Region

Figure 18:
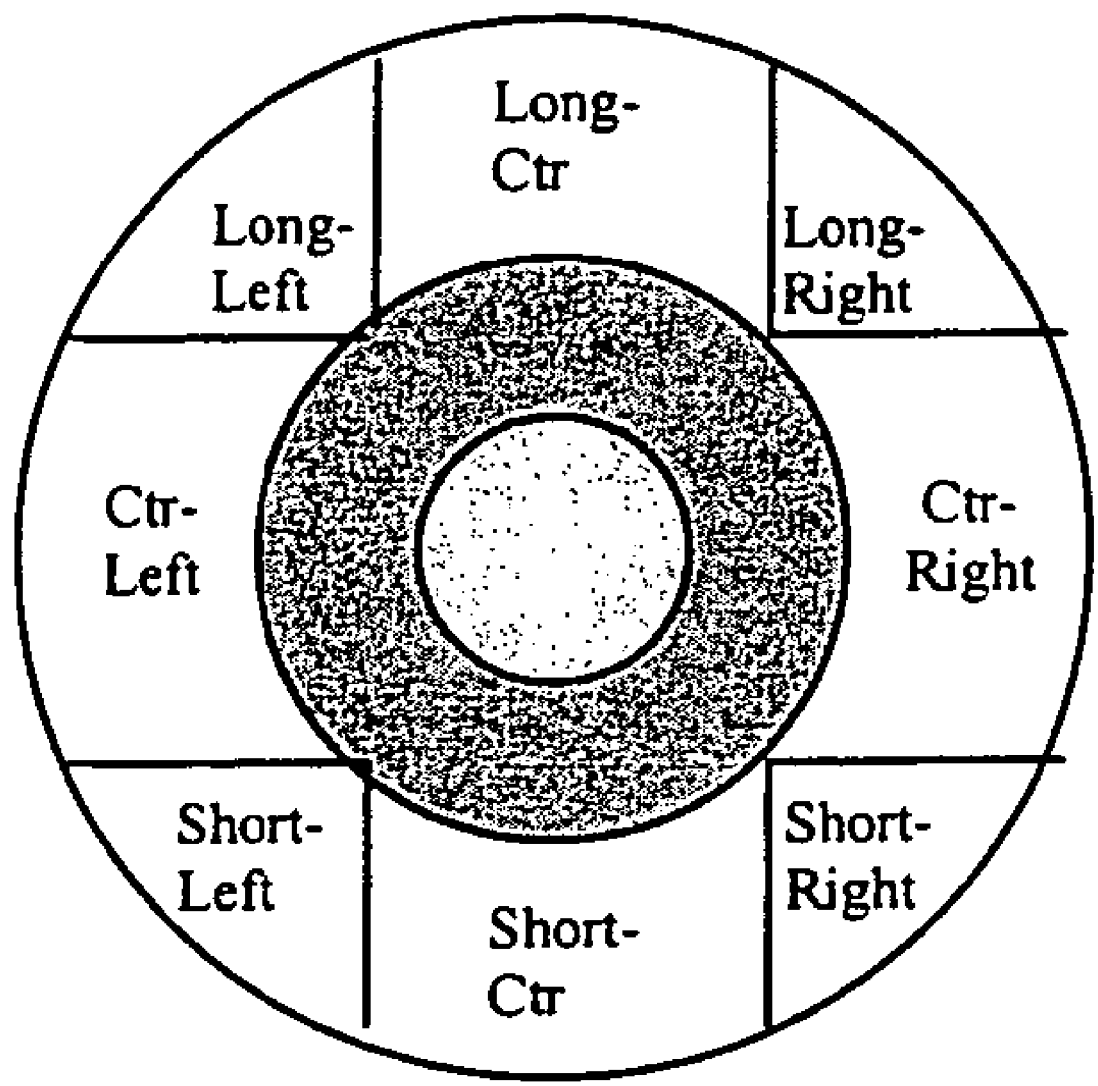
FIG. 18 is a diagram showing various green shot regions in accordance with one embodiment of the present invention.

The green is divided into 10 regions as shown in FIG. 18. These divisions are not necessarily visible to the user. There are two circular regions each of which has an associated distance value that is left variable so that it can be modified. The system preferably automatically determines the region for any putt.

e. Distance Range

The distance range (0–3 feet, 4–6 feet, 7–12 feet, 13–24 feet, or >24 feet) is preferably automatically calculated by the system. If the user desires more precision, the user can click (or tap) on an existing putt icon and enter the precise distance in the dialog box that pops up, as shown in FIGS. 17a (the browser embodiment) and 17b (the handheld computer embodiment).

f. Shot Lie

The shot lie is preferably automatically set to "Green".

g. Club Used

If desired, the system can be configured to enable the user to specify club information. Generally, a putter will be used on the green, but not always. In addition, the user can enter the manufacturer, brand, model, etc. of the club.

In a preferred embodiment, "Club Used" is a secondary property that must be entered by the user. This property may preferably be set globally for an entire round or set of rounds so that the user does not have to enter this information for every shot. However, the user will preferably have the option to set this property for each shot, if the user so desires, to facilitate experimentation with different clubs.

h. Putt Break

This is a secondary property that the user can set by clicking (or tapping) on the putt icon and invoking the dialog editor as shown in FIGS. 17a and 17b. The user can then set the break value.

i. Putt Slope

This is a secondary property that the user can set by clicking (or tapping) on the putt icon and invoking the dialog editor as shown in FIGS. 17a and 17b. The user can then set the slope value.

Those of ordinary skill in the art will appreciate that the present invention is not limited to the putt-related shot properties discussed above, nor does the present invention necessarily require use of any or all of the specific shot properties discussed above.

D. Shot Property Summary

The following table summarizes some of the possible shot properties for both the Hole Editor 22 and Putt Editor 24 and how the property values are preferably recorded for the two types of hole layout graphics.

| Property | Type I Recording Mode | Type II Recording Mode |
| --- | --- | --- |
| Location | Automatic | Automatic |
| Shot Number | Automatic | Automatic |
| Shot Kind | Automatic, Manual | Automatic, Manual |
| Shot Region | Automatic, Manual | Automatic, Manual |
| Distance Range | Automatic, Manual | Automatic, Manual |
| Shot Lie | Automatic, Manual | Automatic, Manual |
| Penalty | Manual | Manual |
| Putt Break | Manual | Manual |
| Putt Slope | Manual | Manual |
| Club | Manual | Manual |
| Stance | Manual | Manual |

-continued

| Property | Type I Recording Mode | Type II Recording Mode |
|---|---|---|
| Strike Quality | Manual | Manual |
| Ball | Manual | Manual |
| Shot Shape | Manual | Manual |
| Init. Shot Direction | Manual | Manual |

As used in the above table, "automatic" means that the system automatically calculates the property values and "manual" means the user manually enters the property value, typically via the drag/drop method (dragging an icon (e.g., lie) and dropping it on a shot icon thereby setting the property value) or using a dialog box.

E. Pin Location Editor

Figure 19:
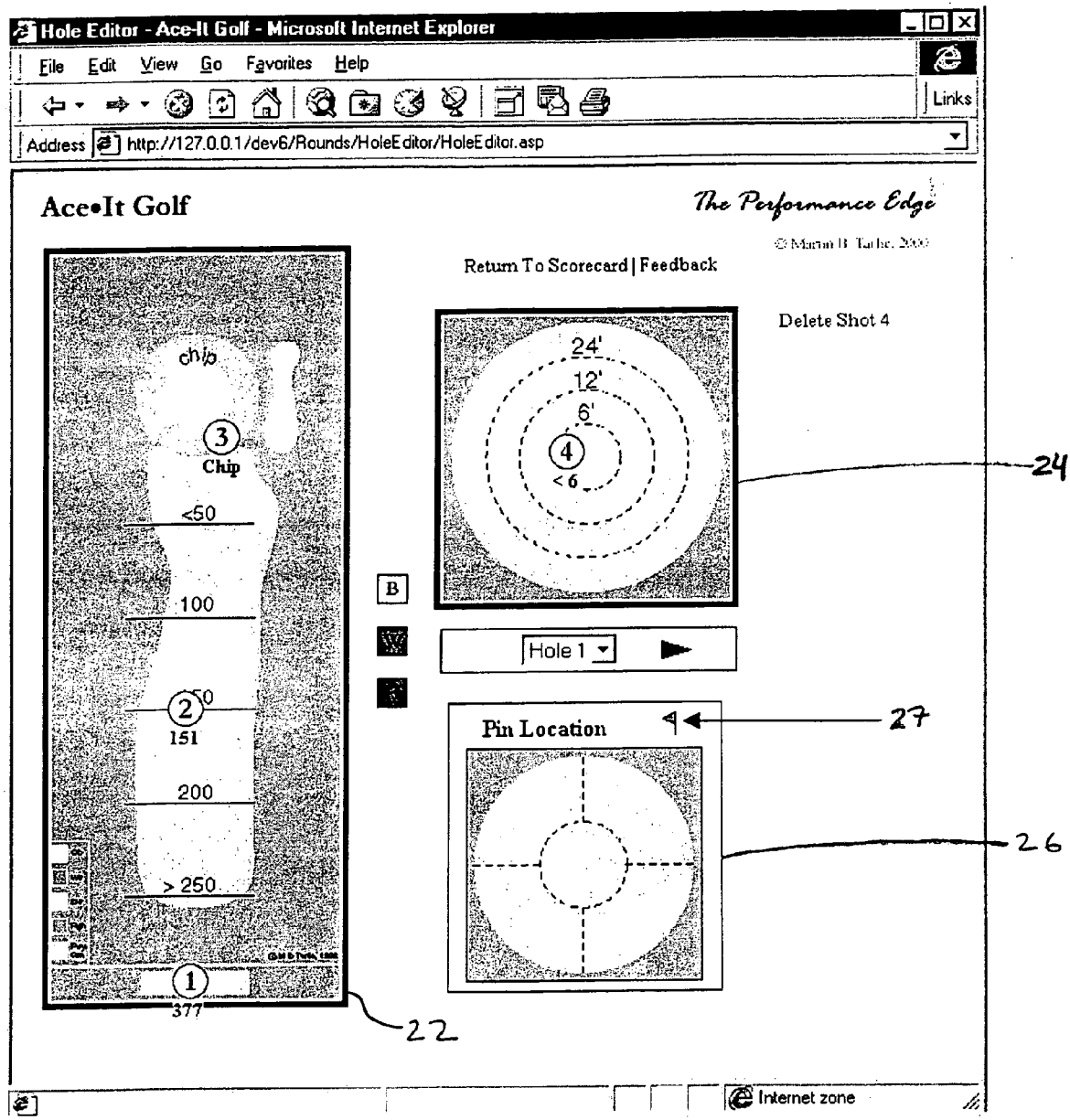
FIG. 19 is a screen shot of a WWW browser-implemented Pin Location Editor in accordance with one embodiment of the present invention.

The Pin Location Editor 26 is used to record the specific location of the hole on the green. The user is presented with a graphic that represents the shape of the green for a particular hole. The user can then drag a flag icon 27 and drop it on a point that corresponds to the pin location for that particular round. This pin location information is then stored for each hole played. A screen shot of the Pin Location Editor 26 is provided in FIG. 19.

II. Data Storage and Information Processing

In a preferred embodiment of the present invention, golf performance data entered by a user will be uploaded to the WWW site and stored in a database, either in a single data transfer with off-line acquisition or during on-line acquisition. This is preferable to having the user store the information on his/her computer for at least two reasons. First, by storing the data remotely, the user does not have to worry about using up memory on his/her computer. Second, because the data is stored on the WWW site, the user can access the stored data from any computer that has Internet access.

Additionally, by having performance data stored on the WWW site for multiple players for multiple rounds, the WWW site operator is able to perform comparative statistical analysis, as discussed in greater detail below.

Figure 20:
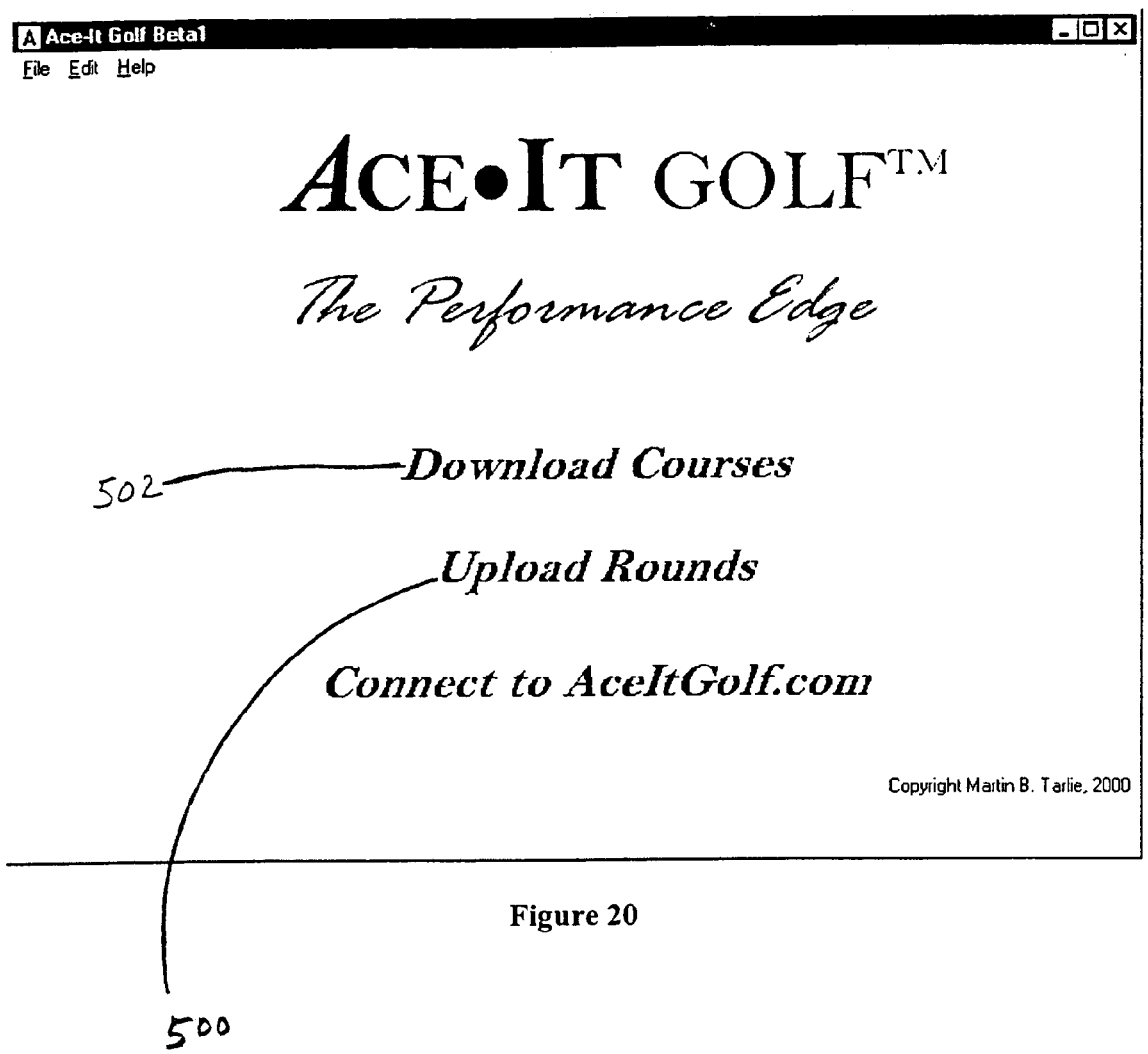
FIG. 20 shows an exemplary screen used by a handheld computer user to upload data to and download course images from the WWW site in accordance with one embodiment of the present invention.
Figure 22:
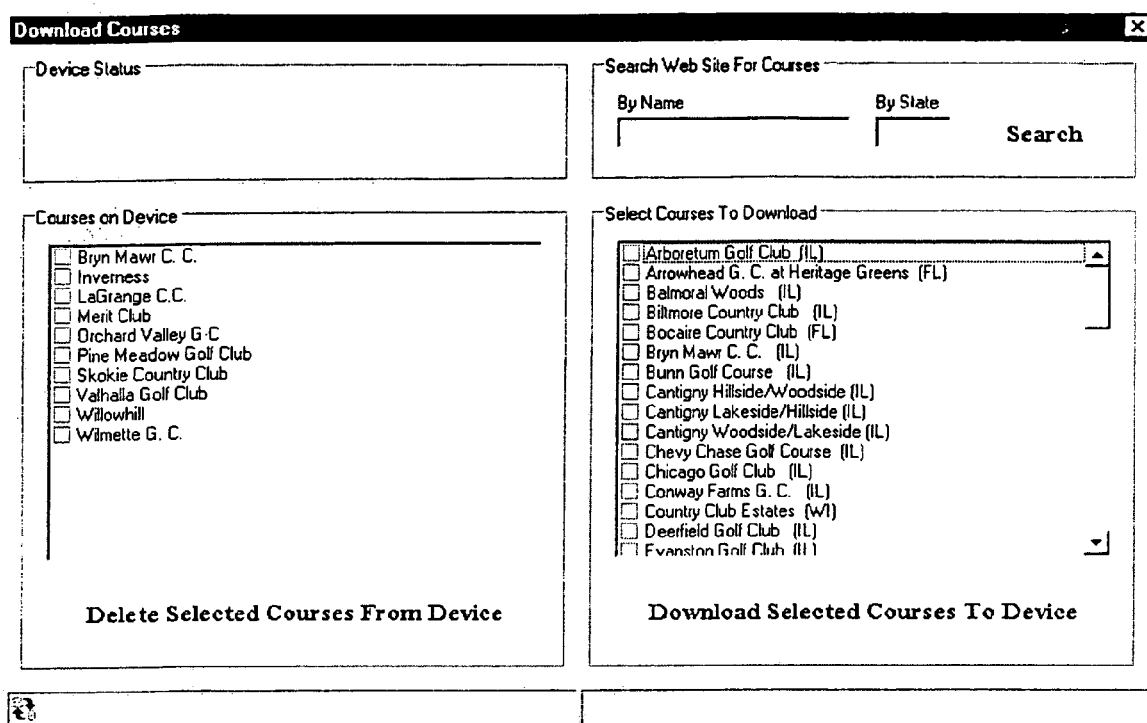
FIG. 22 shows an exemplary dialog box used by a handheld computer user to download selected course images from the WWW site to the handheld computer.

Data storage and processing techniques are well-known to those of ordinary skill in the art and need not be described herein in any detail. In the case of off-line data acquisition, a software program running on the user's computer connects to the WWW site (or other server computer) and uploads the information from the local computer to the remote WWW site. When a handheld computer is used, the handheld computer is typically connected to a PC, which in turn is connected to the Internet, although the handheld computer may be directly connected to the Internet. The user then clicks on the UPLOAD ROUNDS button 500 shown in FIG. 20 and uses the resulting dialog box (shown in FIG. 21) to upload the rounds stored on the handheld computer to the WWW site. Similarly, when the user wants to download course information from the WWW site to the handheld computer, he/she clicks on the DOWNLOAD COURSES button 502 as shown in FIG. 20 and then uses the resulting dialog box (shown in FIG. 22) to download courses from the WWW site to the handheld computer. The user may also search for particular courses or delete courses using the provided interface elements.

In the case of on-line data acquisition, the golf performance data is uploaded to the WWW site by the user using a WWW browser.

Each round that is recorded by the user on the WWW site is preferably assigned a Round ID by the WWW site. The Round ID is a unique identifier used to identify each round. This number is automatically assigned by the WWW site in a standard way and is stored in the database 816 with the recorded golf performance data. Rounds that originate on the handheld computers are also preferably assigned locally unique Round IDs so they can be identified on the local machines, but then are reassigned a unique ID by the WWW site.

III. Data Analysis/Visualization

Once golf performance data has been inputted and stored by the user, the data can be visualized and analyzed by the user. While the software for analysis and visualization may reside on the user's computer, the software preferably resides on the WWW site in a distributed client/server environment (see Section IV below for a discussion of exemplary client/server interactions).

In a preferred embodiment, the user will require a password to access the user database on the WWW site. An access fee is also preferably charged by the WWW site operator, except that the user will preferably have free access for a certain period of time and/or to a certain number of recent rounds.

Figure 23:
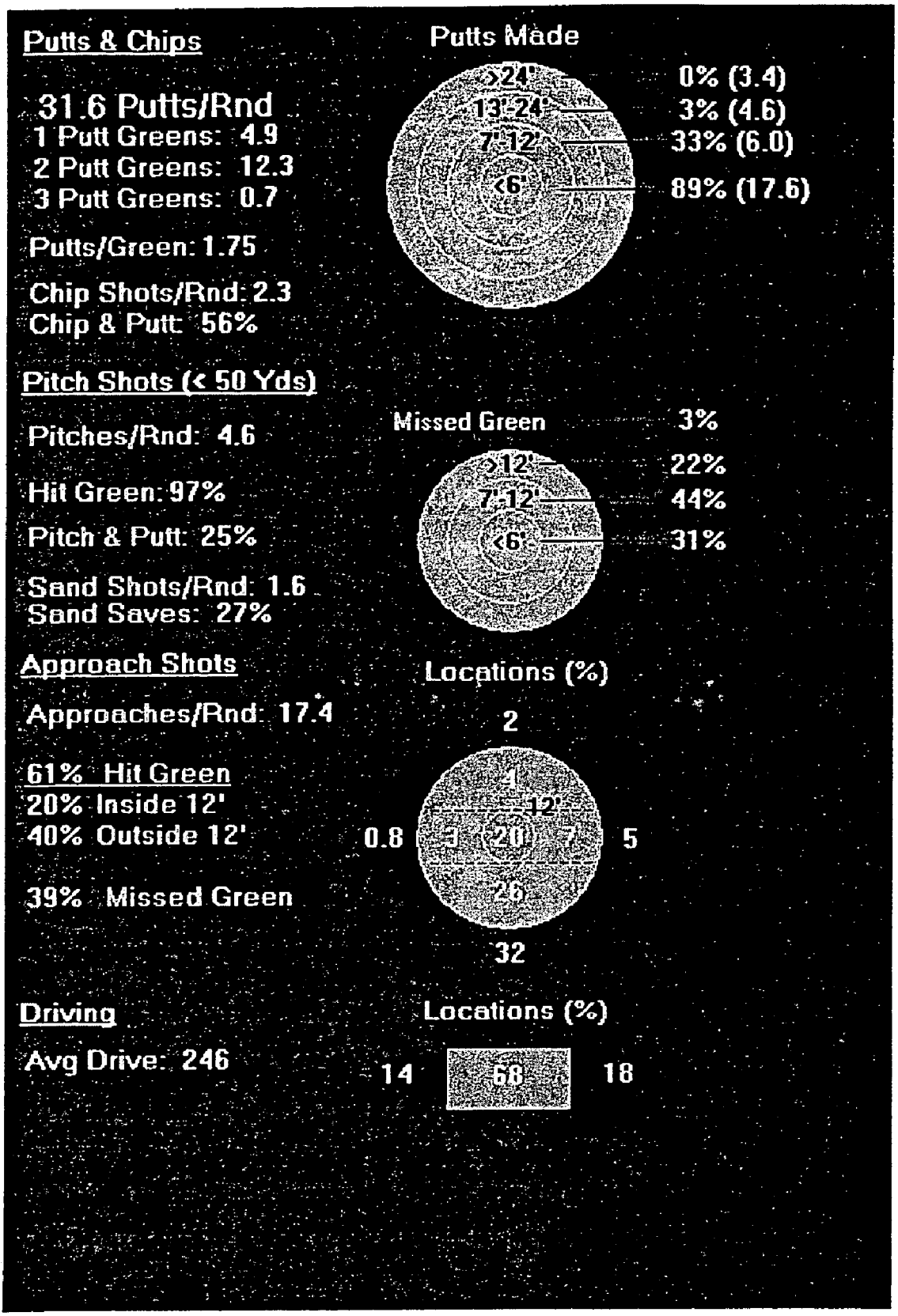
FIG. 23 is a sample output of a Data Analysis/Visualization component in accordance with one embodiment of the present invention.

In the simplest scenario, the user may request information from the WWW site relating to a particular round played using a WWW browser. The request may contain information such as Player, Round Date, Course, or it may simply contain a Round ID and Hole Number. Upon receipt of the request, the WWW site retrieves the requested information from the database and returns the requested information to the user in an appropriate format. The information sent may include a hole image, image layout details, and shot information for all shots played and stored in the database. A sample response from the WWW site is shown in FIG. 23.

Aside from this broad and rudimentary type of visualization and analysis, the WWW site may also be configured to enable users to perform detailed and powerful analyses of stored shot-level performance data through the use of specific queries, as discussed below.

Figure 31:
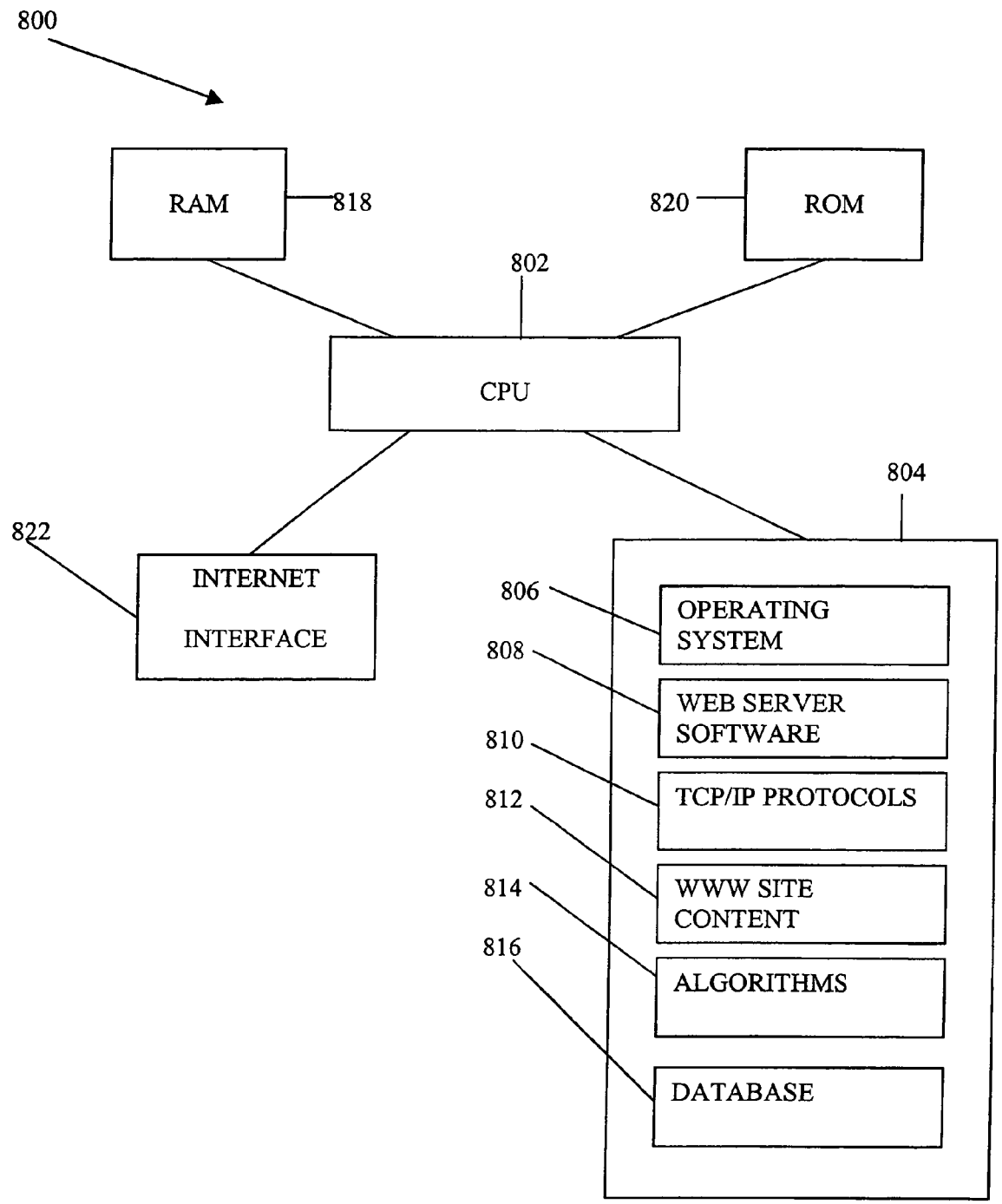
FIG. 31 is a schematic diagram of a Web server in accordance with one embodiment of the present invention.

Referring to FIG. 31, the WWW site is located on a Web server 800. As those of ordinary skill in the art know, a Web server is a computer that provides World Wide Web services on the Internet. Such a computer includes the necessary hardware, operating system, Web server software, TCP/IP protocols, Web site content (Web pages) and algorithms to provide the services at issue.

As shown in FIG. 31, the Web server 800 includes a central processing unit (CPU) 802 for controlling the operation of the Web server 800, at least one hard disk drive 804 which includes the operating system 806, the Web server software 808, the TCP/IP protocols 810, the WWW site content 812, the algorithms 814 for performing the various functions described herein, a database 816 for storing the uploaded golf data and course images and scorecard information as discussed above as well as other desired information, a random access memory (RAM) 818 for storing dynamic data, a read only memory (ROM) 820 for storing control routines, and an Internet interface 822 which connects the Web server 800 to the Internet and the users' computers which are accessing the Web server 800.

Illustratively, the Web server 800 may be a Dell Poweredge 3500 with 256 MB of RAM, two 9-gigabyte hard drives and a 366 MHz Intel Pentium II Processor. Those of ordinary skill in the art will appreciate that the particular configuration of the Web server is largely irrelevant to the present invention, as long as the Web server is capable of performing the functions described herein.

The server operating system may be, for example, Microsoft Windows NT 4.0 with Service Pack 5, and the server software may be Microsoft Internet Information Server 4.0.

Operationally, client requests will preferably use the HTTP protocol, although other protocols, such as the WAP Protocol, may be used. Custom Web server extensions, either in the form of ISAPI (Internet Server Application Program Interface) server extensions or Active Server Pages, may be used to process the client requests. If necessary, the ISAPI server extensions or Active Server Pages may interact with additional server side modules, such as COM (component object model) objects.

In a preferred embodiment, the database 816 is a relational database. Interbase 5.5 may be used as the database management system, if desired.

The following illustrative discussion focuses on an embodiment wherein a WWW site serves as the data analysis/visualization component 16. However, as indicated above, the present invention is not limited to use of the WWW site for analysis and visualization. Rather, analysis and visualization software can reside on a user's computer for local processing if desired.

A. Fundamental Quantities

The following fundamental quantities may be calculated from stored shot-level information and used to respond to user analysis queries.

1. Shot Property

As discussed above, every shot is characterized by a set of Shot Properties, e.g., {Location, Shot Number, Shot Lie, Shot Kind, Shot Region, Distance Range, Break, Slope, Club, Stance, Strike Quality, Ball, Shot Shape, Initial Shot Direction}. Typically, the relevant number of shot properties will depend on the Shot Kind. For example, putts will tend to have different properties than tee shots or approach shots.

Let N denote the number of properties for a given shot, and $SP\_1, SP\_2 \ldots SP\_N$ denote each property. The set of all shots can be visualized as defining an N-dimensional space. The WWW site can be configured to allow complete flexibility in identifying certain (not necessarily contiguous) portions of this space and allow players to inquire about the effect of performance improvements on their score.

2. Shot Property Domain

Each shot property has an associated domain of possible values, which can be denoted by $PD\_1, PD\_2 \ldots PD\_N$. For example, the shot lie property can assume any one of the following values: Tee, Fairway, Rough, Bunker, Fringe, Water, Green, Out of Bounds.

3. Property Value Subset $PV\_i$ denotes a subset of property values for shot property $SP\_i$. For example, if one considers Shot Lie, then an example of a subset of property values is {Fairway, Rough, Bunker}.

4. Histogram of Hole-Out Values

Given a subset of possible values for each property for a particular shot, the WWW site can be configured to calculate the distribution of number of shots to hole out. Specifically, based on the data stored in the database, the system can calculate the number of times the player requires 1 shot to hole out—HO[1], 2 shots to hole out—HO[2], 3 shots to hole out—HO[3], etc. Formally, the histogram of hole-out values, HO, is a function of the subset of property values $PV\_i$ for each property $SP\_i$ and can be written as $HO(PV\_1, \ldots PV\_N)$.

The distribution of hole-out values, HO, is a fundamental quantity that can be used to calculate many statistical values. Some useful quantities include:

$$\text{Average number of shots required to hole out} = \frac{\sum_i HO[i] \times i}{\sum_i HO[i]}$$

$$\text{Probability of holing out in } i \text{ shots} = \frac{HO[i]}{\sum_i HO[i]}$$

5. Shot Result Set

Given a subset of possible values for each property for a particular shot, the WWW site can be configured to calculate the set of shot results, SR. Each element of the set of shot results is itself a shot, except for hole-outs. Formally, the set of shot results, SR, is a function of the subset of property values $PV\_i$ for each property $SP\_i$ and can be written as $SR(PV\_1, \ldots PV\_N)$.

B. Analysis Examples

Based on the foregoing fundamental quantities which can be calculated from stored shot-level information, the WWW site may readily be configured by those of ordinary skill in the art to respond to specific user analysis queries using both well-known and novel algorithms. A non-exhaustive list of such representative user queries is set forth below.

1. Tee Shot Analysis

In the context of tee shots, a user's queries may vary depending on whether the hole is a par 3, a par 4 or a par 5.

For par 3s, possible user queries include:

Show me a comparison of my hole-out average when I hit the green versus when I miss the green.

How does my hole-out average depend on the length of the hole?

Show me a scatter plot of my tee shot results. Allow me to filter by various properties, including hole length, club, etc.

Show me a history of my shot performance on a specific hole.

For holes of a given length that I can specify, if I increase my ability to hit the ball within X feet by Y %, how many shots per round will that save me?

For par 4s, possible user queries include:

If I increase my driving distance by Y yards, how many shots will that save (or cost) me?

If I increase the number (or percentage) of fairways I hit per round to Y, how many shots will that save me?

What is my hole-out average as a function of driving distance? Allow me to select a driving distance range and compare my hole-out average when I hit the fairway versus when I miss the fairway.

Show me my average score by hole length.

Show me my distribution of result shots by shot type. For example, how many drives result in approaches, pitches, penalties, recoveries, layups, etc.?

How many shots do I lose because I hit my drives out of bounds, into the water, or generally unplayable?

Show me a history of my shot performance on a specific hole.

For par 5s, possible user queries include:

If I increase my driving distance by Y yards, how many shots will that save me?

If I increase the number (or percentage) of fairways I hit per round to Y, how many shots will that save me?

What is my hole-out average as a function of driving distance? Allow me to select a driving distance range and compare my hole-out average when I hit the fairway versus when I miss the fairway.

What is my hole-out average as a function of driving accuracy?

Show me my average score by hole length.

How many shots do I lose because I hit my drives out of bounds, into the water, or generally unplayable?

How many drives require me to hit a recovery shot?

Show me a history of my shot performance on a specific hole.

Figure 24:
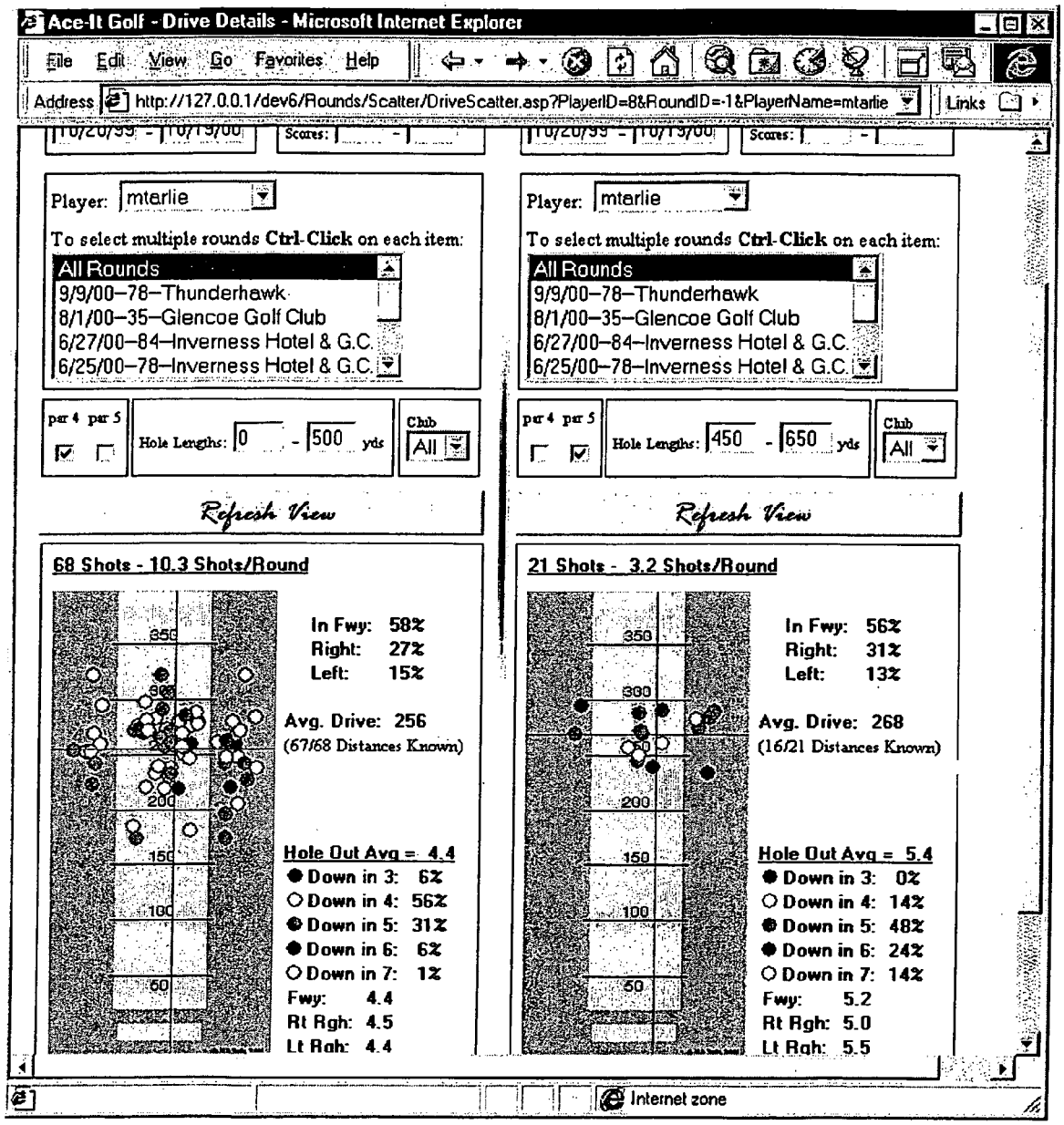
FIG. 24 is a sample tee shot analysis output screen for a WWW browser in accordance with one embodiment of the present invention.

Exemplary tee shot scatter plots are shown in FIG. 24. The user can preferably filter the performance analysis by date, scoring range, any combination of specific rounds played, par on the hole in which the drive was hit, length of the hole, and club using the various graphical user interface elements provided. The screen is preferably split into two halves, allowing the user to easily compare performance by modifying the filter criteria and refreshing the views using the REFRESH VIEW button.

Figure 25:
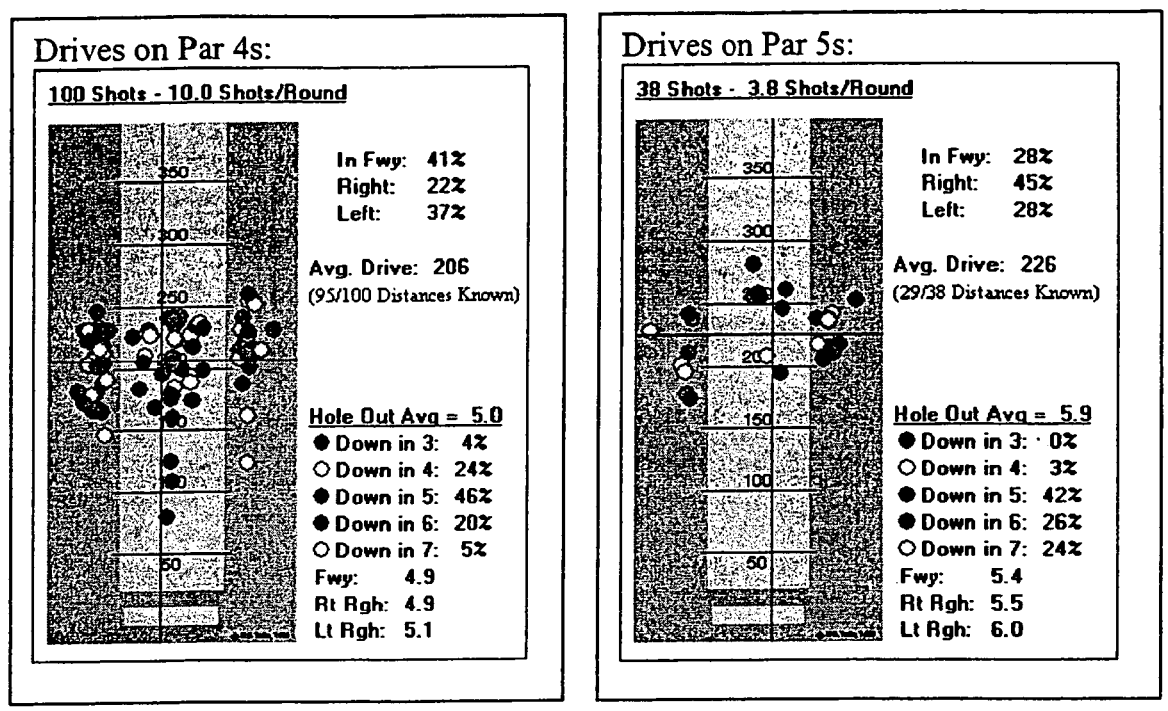
FIG. 25 is a sample analysis of driving performance on par 4s and par 5s in accordance with one embodiment of the present invention.

A second analysis example is provided in FIG. 25, which shows a summary of driving performance on par 4s and par 5s for 10 rounds of golf In the case of performance on par 4s (left side), the exemplary question may be asked "How many shots will I save if I improve the number of fairways hit on par 4s from 41% to 67%?" By using the following novel formula, it can be determined that 0.6 shots per round will be saved:

$$\text{Shots saved} = [PI*FH + (PFR/PFM)*(100-PI)*FR + (PFL/PFM)*(100-PI)*FL) - HA]*SR$$

where

PI=increased (i.e. new) percentage of fairways hit
FH=hole-out average when the fairway is hit
PFR=percentage of fairways missed right
PFM=percentage of fairways missed
FR=hole-out average when fairway is missed right
PFL=percentage of fairways missed left
FL=hole-out average when fairway is missed left
HA=hole-out average
SR=shots per round Similarly, in the case of par 5 performance (right side), the question may be asked "How many shots will I save if I improve the number of fairways hit on par 5s from 28% to 67%?" Using the same formula as above, the answer is determined to be 1.5 shots per round.

The foregoing analysis examples are merely illustrative of the analytic capabilities of the present invention. Those of ordinary skill in the art will appreciate that by storing comprehensive shot and hole-level information for multiple rounds of golf, users of the present invention are able to perform worthwhile analyses which will greatly assist them in improving their golf games.

2. Approach Shot Analysis

In the context of approach shots, possible user queries include:

Show me a scatter-plot of my approach shot results. Allow me to filter by relevant shot properties, e.g. shot distance, lie, club.

Show me my distribution of hole-out values and various derived statistical quantities, including my hole-out average. Allow me to filter by relevant shot properties, e.g. shot distance, lie, club.

How many shots do I lose because I hit my approach shots out of bounds, into the water, or generally unplayable? Allow me to filter by relevant shot properties, e.g. shot distance, lie, club.

Show me my distribution of result shots by shot type. For example, how many drives result in approaches, pitches, penalties, recoveries, layups, putts, etc.? Allow me to filter by relevant shot properties, e.g. shot distance, lie, club.

For a given distance range that I can specify, if I increase my ability to hit the green by Y %, how many shots per round will that save me?

For a given distance range that I can specify, if I increase my ability to hit the ball within X feet by Y %, how many shots per round will that save me?

Show me how many approach shots I hit per round and allow me to filter by various shot properties, e.g. distance, club, lie, etc.

Figure 26:
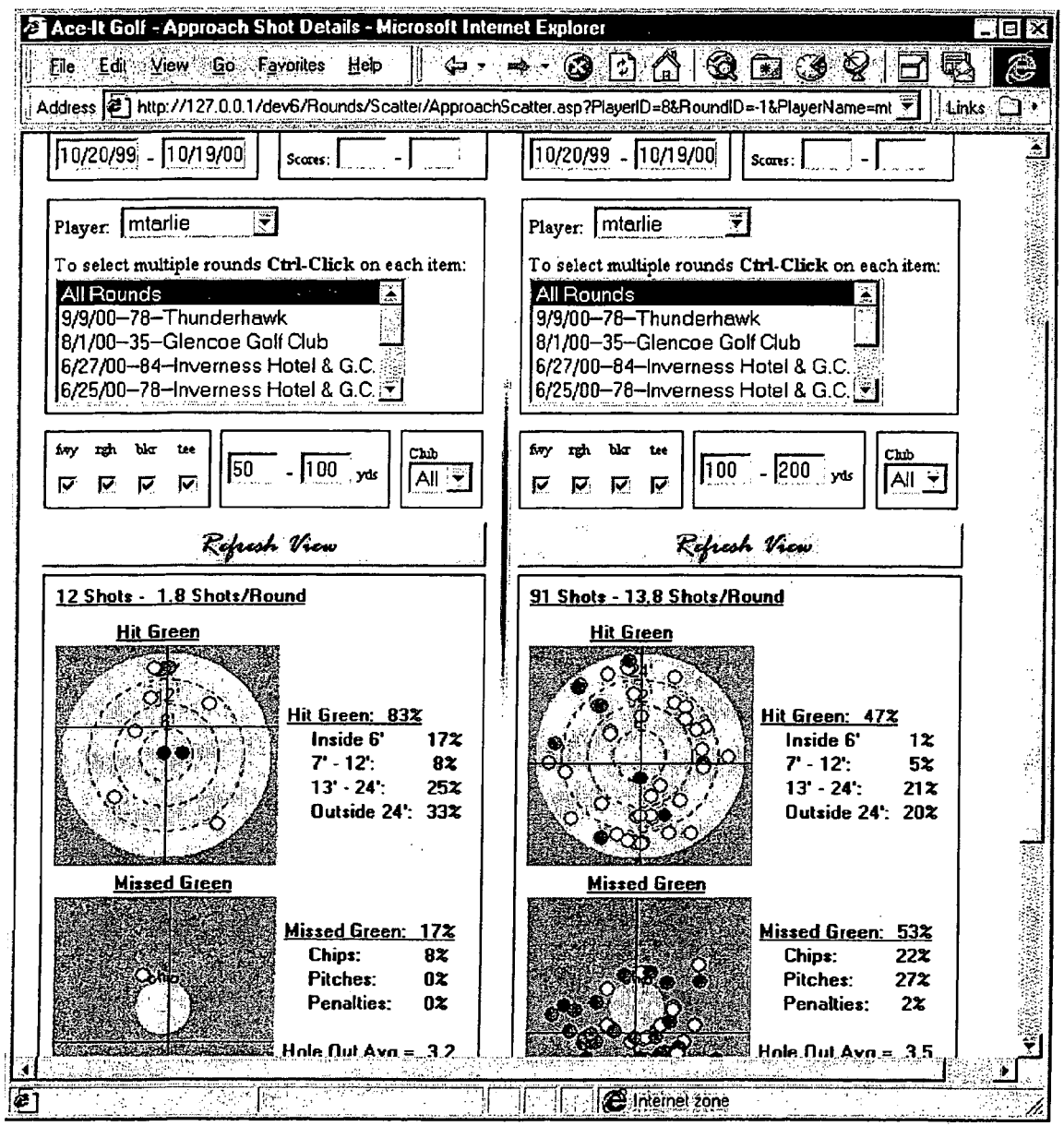
FIG. 26 is a sample approach shot analysis output screen for a WWW browser in accordance with one embodiment of the present invention.

Exemplary approach shot scatter plots are shown in FIG. 26. The user can filter the performance analysis by date, scoring range, any combination of specific rounds played, lie, distance and club. The screen is split into two halves, allowing the user to easily compare performance by modifying the filter criteria and refreshing the views.

When dealing with the issue of approach shots, it is helpful to introduce the concept of personal approach distance, or PAD. The game of golf is defined such that the par player, i.e., "scratch" golfer, is expected to hit the green on the shot numbered par-2, e.g. the first shot on a par 3, second shot on a par 4, etc. However, most players are not par players and in fact have high handicaps (the average being in the 16–18 range). For these players, it is not necessarily realistic to expect them to hit the green on shot par-2.

To address this issue, a PAD may defined for a given player. The PAD is the distance from the green, regardless of the number of the shot relative to par, that the player in question should be able to land the ball on the green. In one embodiment, the PAD may be determined for each player by taking 80% of the player's average driving distance. The logic in tying the PAD to average driving distance is that the average driving distance is strongly indicative of the player's ability to apply power accurately and efficiently to the golf ball. Moreover, current statistics strongly support the relevance of 80%. As more data are collected, however, both for individuals and collectively, the percentage can be refined and compared to the players' detailed approach shot statistics filtered by distance.

Figure 27:
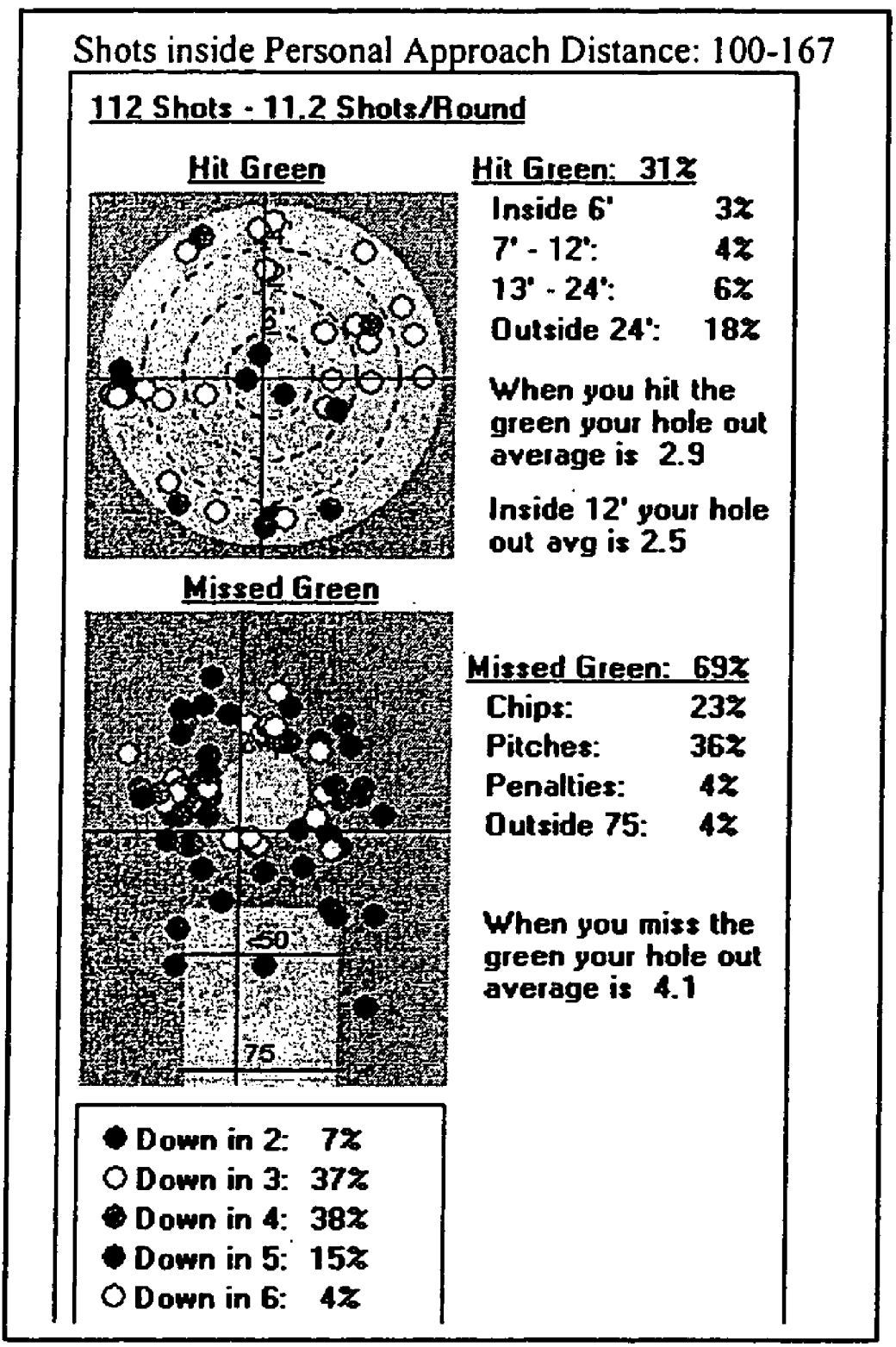
FIG. 27 is a sample analysis of personal approach distance performance in accordance with one embodiment of the present invention.

By increasing the number of times the green is reached within his or her PAD, a player is able to reduce the overall number of shots per round. An exemplary personal shot distance analysis for a PAD of 167 yards using data from 10 rounds of golf is provided in FIG. 27. In this case the player hits the green within a distance range of 100 yards to the PAD only 31% of the time. By using the novel formula set forth below, it can be readily determined that if, for example, the player increases the number of greens hit from 31% to 50%, he/she will save 2.5 shots/round; if the player increases the number of greens hit from 31% to 60%, he/she will save 3.9 shots per round; and if the player increases the number of greens hit from 31% to 75%, he/she will save 5.9 shots per round:

$$\text{Shots Saved} = [GHA*PHN + MGHA*(100-PHN) - GHA*PHA - MGHA*(100-PHA)]*SR$$

where
GHA=hole-out average when green is hit
PHN=new hit green percentage
MGHA=hole-out average when green is missed
PHA=actual hit green percentage
SR=shots per round 3. Pitch & Chip Shot Analysis In the context of pitch and chip shots, possible user queries include:

Show me a scatter-plot of my pitch or chip shot results. Allow me to filter by relevant shot properties, e.g. shot distance, lie, club.

Show me my distribution of hole-out values and various derived statistical quantities, including my hole-out average. Allow me to filter by relevant shot properties, e.g. shot distance, lie, club.

If I increase my ability to hit the green by Y %, how many shots per round will that save me? Allow me to filter this request by relevant shot properties, e.g. distance, lie, club.

If I increase my ability to hit the ball within X feet by Y %, how many shots per round will that save me? Allow me to filter by relevant shot properties, e.g. shot distance, lie, club.

Show me how many approach shots I hit per round and allow me to filter by various shot properties, e.g. distance, club, lie, etc.

Figure 28:
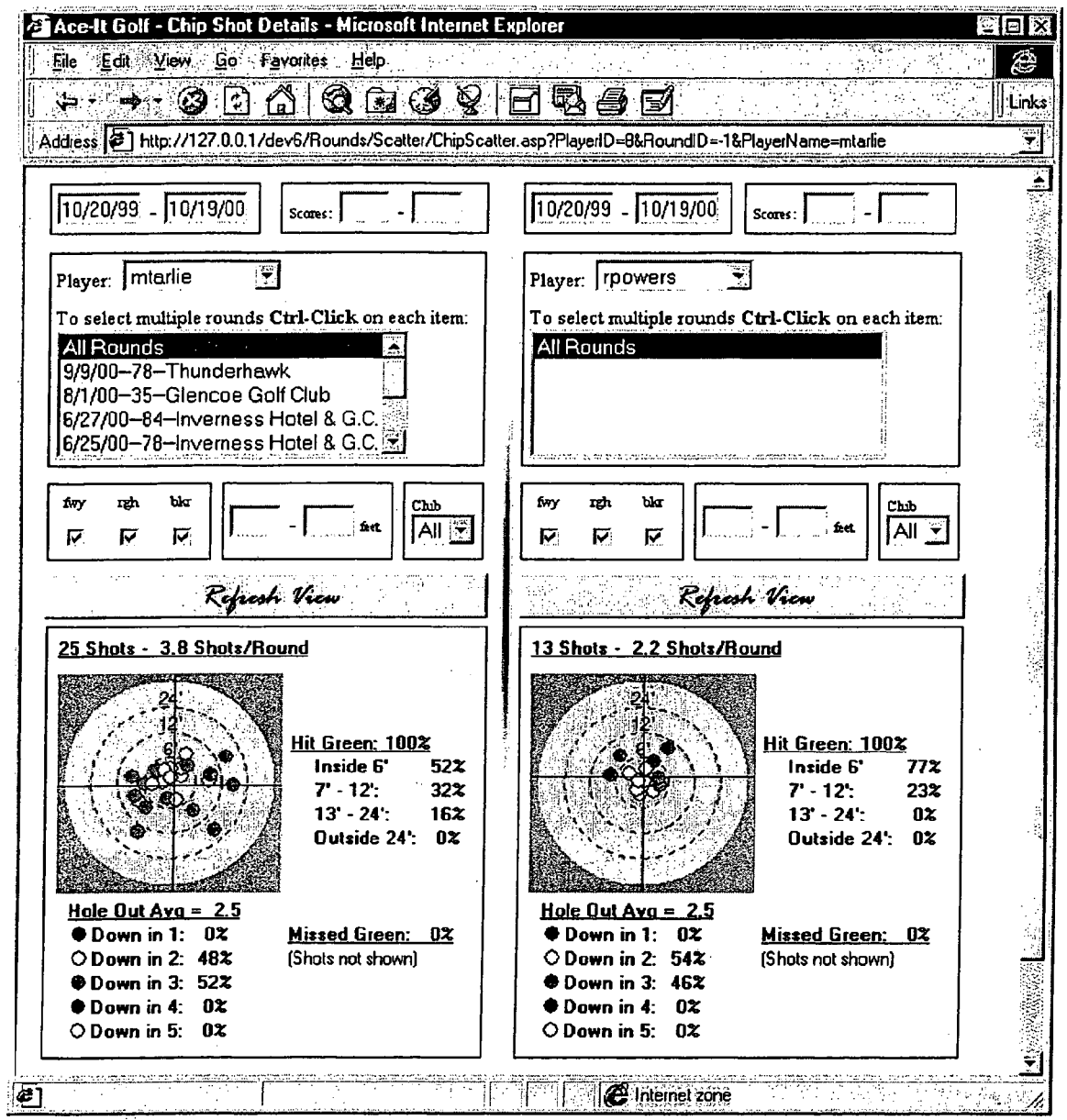
FIG. 28 is a sample chip shot analysis output screen for a WWW browser in accordance with one embodiment of the present invention.

Exemplary chip shot scatter plots are shown in FIG. 28. The user can filter the performance analysis by date, scoring range, any combination of specific rounds played, lie, distance and club. The screen is split into two halves, allowing the user to easily compare performance by modifying the filter criteria and refreshing the views.

Figure 29:
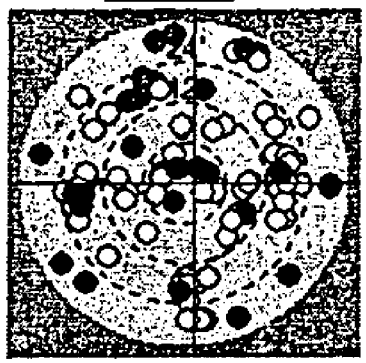
FIG. 29 is a sample analysis of pitch shot performance in accordance with one embodiment of the present invention.
Figure 29:
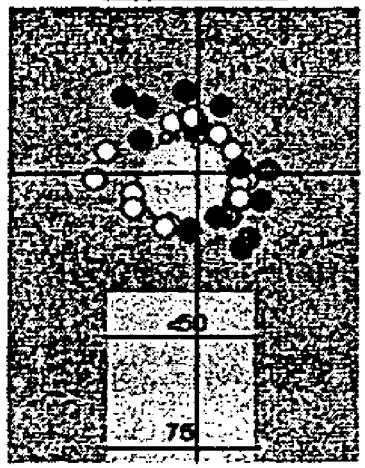
Figure 30:
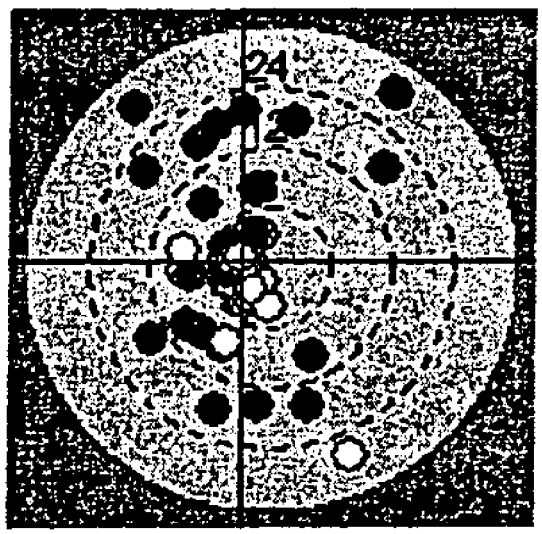
FIG. 30 is a sample analysis of chip shot performance in accordance with one embodiment of the present invention.

Additional examples of pitch and chip shot analysis are provided in FIGS. 29 and 30. Referring to FIG. 29, an analysis of a player's pitching performance over 10 rounds of golf is shown. By using the novel formula set forth below, it can be determined, for example, that if the player increases the greens hit from 73% to 90%, the player will save 1.4 shots per round:

$$\text{Shots Saved} = [GHA*PGN + MHA*(100-PGN) - GHA*PGA - MHA(100-PGA)]*SR$$

where
GHA=hole-out average when green is hit
PGN=new green hit percentage
MHA=hole-out average when green is missed
PGA=actual green hit percentage
SR=shots per round Similarly, by using the novel formula set forth below, it can be determined, for example, that if the player increases the percentage of shots that end up within twelve feet of the hole from 25% to 50%, 2.6 shots per round will be saved:

$$\text{Shots Saved} = [(PN/PGH)*IHA + ((PGH-PN)/PGH)*OHA]*PGH*SR$$

where
PN=new percentage of shots that end up within twelve feet of the hole
PGH=percentage of greens hit
IHA=hole-out average inside twelve feet
OHA=hole-out average outside twelve feet
SR=shots per round Referring to FIG. 30, an analysis of a player's chipping performance over 10 rounds of golf is shown. The novel formula, set forth below is used to determine, for example, that if the player increases the number of chip shots that end up inside of six feet from the hole from 54% to 75%, the player will save 0.8% shots per round:

$$\text{Shots Saved} = [IHA*PN + OHA*(100-PN) - IHA*PI - OHA(100-PI)]*SR$$

where
IHA=hole-out average for chips inside 6 feet
PN=new percentage of chip shots within 6 feet
OHA=hole-out average for chips outside 6 feet
PI=actual percentage of chip shots within 6 feet
SR=shots per round 4. Putt Analysis In the context of putts, possible user queries include:

Show me a scatter-plot of my putt results. Allow me to filter by relevant shot properties, e.g. distance, break and slope.

Show me my distribution of hole-out values and various derived statistical quantities, including my hole-out average. Allow me to filter by relevant shot properties, e.g. distance, break and slope.

For a given distance range that I can specify, if I increase my ability to hit the ball within X feet by Y %, how many shots per round will that save me?

Consider the following chart which summarizes a player's putting performance over 10 rounds of golf.

| Distance | #/Round | First Putts | One Putts | Two Putts | Three Putts | Poor 1st | Poor 2nd | <.6' |
|---|---|---|---|---|---|---|---|---|
| >.24' | 4.0 | 4.0 | 0.5/12% | 2.0/50% | 1.5/38% | 0.2/13% | 1.3/87% | 73% |
| 13'–24' | 6.1 | 6.0 | 0.5/8% | 4.4/72% | 1.2/20% | 0.2/17% | 1.0/80% | 97% |
| 7'–12' | 3.7 | 3.0 | 1.0/27% | 2.7/73% | 0/0% | N/A | N/A | N/A |
| 0–6' | 19.5 | 4.9 | 15.9/82% | 3.5/18% | 0 | N/A | N/A | N/A |
|  | 33.3 |  |  |  | 2.7 | N/A | N/A | N/A |

By using this aggregated historical data, it is possible to perform powerful and meaningful analyses which can help the player understand areas for improvement:

Long Putts (>24'):

From outside 24' the player three-putts 38% of the time. Eliminating three puts will save the player 1.5 shots/round.

Medium Putts (7'–24'):

13'–24':

The player is three putting 20% of the time from this distance. Eliminating three puts from this distance will save the player 1.2 shots/round.

The player is making 8% of putts from this distance. Increasing this percentage to 20% will save the player 0.7 shots/round.

7'–12':

The player is making 27% of putts from this distance. Increasing this percentage to 40% will save the player 0.5 shots/round.

Short Putts (<6'):

The player is making 82% of putts inside 6'. Increasing this percentage to 90% will save the player 1.5 shots/round.

The following table summarizing the foregoing scenarios:

| Summary of Putting Improvement Scenarios | Shots Saved |
|---|---|
| From outside 24', eliminate three putts by getting first putts within tap-in range. | 1.5 |
| From 13'–24': | |
| Eliminate three putts by putting these to within tap-in range | 1.2 |
| Increase make percentage from 8% to 20% | 0.7 |
| | 1.9 |
| From 7'–12', increase make percentage from 27% to 40% | 0.5 |
| Inside 6', increase make percentage from 78% to 90% | 1.5 |
| Total putts saved/round | 5.4 |

The foregoing shot analyses (drives, approach shots, pitches, chip shots and putts) are illustrative of the capabilities of the present invention and the present invention is not limited to any particular type of analysis. Those of ordinary skill in the art will appreciate that by storing performance data for multiple rounds, at both the shot and hole-levels, the WWW site can be configured to perform varied and powerful user-initiated analyses to help the users identify areas of weakness and set goals for improvement.

5. Round Analysis

In the context of golf rounds, possible user queries include:

Show me a list of my recorded rounds.

Show me a basic summary of my performance for all rounds or allow me to select the specific rounds to include in the analysis. A basic summary may include averages per round of the following quantities: numbers of pars, birdies, eagles, bogeys, double bogeys, penalties, recovery shots, "others", score on par 3s, par 4s, and par 5s, greens in regulation, putts, driving length, and fairways hit.

Show me my shot performance aggregated over all, or a selected group of my rounds.

Compare my performance in my best (e.g. top 25% score percentile) and worst (e.g. bottom 25% score percentile) rounds. Allow me to select the criteria for best and worst.

Compare my performance against other players. Allow me to select the comparison group by either handicap or scoring average.

For each recorded round show me a basic summary. A basic summary may include the following quantities: numbers of pars, birdies, eagles, bogeys, double bogeys, penalties, recovery shots, "others", score on par 3s, par 4s, and par 5s, greens in regulation, putts, driving length, and fairways hit.

For each recorded round let me examine my shot performance.

6. Comparisons

Because data for all system users is preferably stored in the database 816, the WWW site can also be readily configured to perform comparative analyses:

Make my performance statistics available to other named members of the WWW site (e.g., a buddy list) so they can view my performance and compare their performance to mine.

Compare my performance to individuals from a named list of high profile players (both amateur and professional).

Compare my performance to the aggregate performance of groups of players, where the groups can be defined by filtering the database using any combination of the following:

Average score range

Handicap range

Player status (e.g. recreational amateur, competitive amateur, collegiate player, mini-tour player, Buy.com Tour player, PGA Tour player, LPGA tour player, European PGA Tour player, etc.)

Compare my performance information by course. Allow me to filter my comparisons by course name, course length, course slope, course rating.

Compare my performance by clubs used. For example, if I am testing out different drivers, or putters, or wedges, allow me to compare my performance statistics with the different clubs.

Compare my performance on different holes based on the characteristics of the hole, including par, distance, shape (straight, dogleg left, dogleg right, etc).

Compare my performance information by date. When viewing performance data or viewing comparisons, I would like to have the option to filter the information by date.

7. Game Integration

The WWW site can also be configured to perform simulations based on stored data:

Integrate my performance profile, as determined from my data in the database, into a computerized golf game engine so that I can play a computerized golf game in a manner that is statistically similar to how I actually play.

It is clear from the foregoing that the recording of shot-level information enables the implementation of a robust, versatile and extremely useful data analysis/visualization component 16.

IV. Client/Server Communications

In a preferred embodiment of the present invention, data acquisition and analysis is performed in a distributed client/server environment (i.e., WWW browser and WWW server).

One significant benefit of this client/server architecture is that it does not require the client (i.e., the user's computer) to store any persistent data. Rather, every time a client requests information about a set of shots (e.g., a user requests a WWW page for a given hole that he/she played) the appropriate information is sent from server (i.e., the WWW site) to client. While in some cases the client might cache some information, this is an optional client decision and is usually done to improve performance. Every time client requests are sent to the server (usually initiated by user-triggered events), the server processes the request, possibly performs some calculations, stores relevant data, and sends the processed information back to the client.

In accordance with a preferred embodiment of the present invention, the client can operate in one of at least two modes:

Mode I

In Mode I, client requests, generally triggered by user-generated events, are sent immediately to the server, which processes the request and responds immediately, allowing the client user interface (e.g., the WWW browser) to be updated in real time or near real time.

Mode II

In Mode II, a set of client requests, generally triggered by user-generated events, is cached on the client, either in a volatile state (e.g., Random Access Memory) or in a persistent form (e.g., a file system on a hard drive). At the appropriate time, e.g., when a given user interface element is unloaded, the set of client requests is sent to the server for processing.

The choice of Mode I or II depends primarily on the processing power of the client. For example, when users are entering shots played for a round of golf (such as by clicking on the appropriate image), the lie of the shot may be determined by matching the background color underneath the location of the shot with a color legend. However, certain clients (e.g., scriptable web browsers) are not able to perform these calculations. In that case, the client sends information to the server about the location of the user's click and additional context information (such as the Round ID, Hole Number, etc.). The server then processes the client request by performing the appropriate calculations (e.g. calculating the lie of the shot), stores the data in the server-side database, and then responds to the client request with the processed information. The client can then update the user interface as appropriate.

One benefit of Mode I is that it can be implemented in a scriptable client environment (e.g., 4 level browser or above) and, therefore, no configuration is required on the client side. This means that the system is immediately available to any client hitting the server that runs a suitable scripting environment. In the Internet environment, the fact that the user is not required to perform, nor wait for any configuration processes, is very significant from a user experience standpoint.

Other clients might have more processing power, in which case it might be appropriate for the client to operate in Mode II. In that case, the client is able to perform the necessary calculations and only needs to contact the server to store or retrieve the relevant information in the server-side database 816. The client can cache (either in volatile RAM or in a persistent file system) a set of shots, e.g., shots played on a particular hole or shots hit in a practice session. A client might also want to operate in Mode II for performance reasons in that network traffic is reduced and the server is asked to perform fewer discrete tasks. For example, a version of the system may be implemented that utilizes ActiveX controls that are downloaded from the WWW site and installed by an ActiveX aware client, such as a Microsoft Internet Explorer browser. The binary code modules that are downloaded from the server and that reside on the client machine have the capacity to perform the required calculations (e.g., determine the shot lie based on location), and, therefore, only send insert, update, delete, or retrieve requests to the server. For performance reasons it might therefore be advantageous to cache a set of client requests. These code modules do not ultimately store any data. Rather, they are responsible for providing the user interface, receiving client requests and passing these on to the server, receiving the server's response, and updating the user interface.

The following discussion illustrates exemplary interactions between the client and server in the context of certain Mode I events discussed above:

A. Client Requests Information from Server about a Given Hole Played.

The request may contain information such as Player, Round Date, Course, Hole Number, or it may simply contain the Round ID and Hole Number and require the server to look up the other information, if necessary, in the server-side database 816.

B. Server Sends Client Hole and Shot Information for a Given Hole Played after Receiving Request A.

Information sent may include a hole image, image layout details, and shot information for all shots played and stored in the server-side database. The exact information sent to the client will depend on the exact state of the client at the time of the request. The server preferably makes no assumptions about the state of the client and is always prepared to send exactly what the client needs.

C. Client Renders user Interface Based on the Information Received from the Server.

The hole image (either generic or custom) and shot icons will be shown.

D. User Clicks on Portion of Hole Editor Image or Putt Editor Image not Containing a Shot Icon.

The client determines location of click event and client sends message to server with location of click event, image clicked (either Hole Editor or Putt Editor), and context information (e.g., Round ID, Hole Number, Player, etc.):
  1. Server calculates shot properties (e.g., shot lie, type of shot, region) based on the location of the click event and the context information sent by the client.
  2. Server stores shot information calculated in step 1 in the server-side database
  3. Server sends shot information calculated in step 1 back to client
  4. Client updates user interface (i.e., renders icon for new shot) based on information sent by server in step 3

E. User Clicks on Shot Icon.

A popup dialog box appears and data values are set based on current shot properties. The user then edits the shot properties and submits the update request to the server:
  1. Server updates shot properties stored on server
  2. Server sends confirmation back to client
  3. Client updates the user interface for edited shot F. User Drags Lie Icon and Drops it on Shot Icon.
  1. Client submits lie value and context information (Round ID, Hole Number, Shot Number) to server
  2. Server updates lie information for shot stored on server
  3. Server sends confirmation back to client
  4. Client updates user interface to indicate updated lie G. User Interface Provides user Opportunity to Delete the Highest Shot in the Sequence.

Only allowing the user to delete the highest shot number ensures that the shot sequence will be maintained:
  1. Client submits delete request (including Round ID, Hole Number, Shot Number) to server
  2. Server deletes shot information from the database
  3. Server sends confirmation of delete back to client
  4. Client updates user interface by deleting icon for the deleted shot The foregoing discussion of client/server communications is exemplary and for illustrative purposes only. Those of ordinary skill in the art will appreciate the present invention is not necessarily limited to any particular client/server communications or modes of operation.

V. Practice Environment

The system 10 allows golfers to record, in a simple, quick, and intuitive manner, a set of shots for each hole played in a round of golf Each shot played on a given hole for a particular round of golf is recorded for subsequent analysis, and each shot is characterized by a variety of different properties as described above. The concept of recording sets of shots (e.g., shots played on a given hole), however, is not limited to actual rounds played but can be extended to the context of practice shots. At least two different scenarios can be implemented in the practice environment: (i) practice drills and (ii) short game simulations.

Part of the value of the practice-oriented modules described below is that once the player identifies a weak area of his/her game, he/she can then use the practice modules as a tool to help improve this area.

A. Practice Drills

In this case, the player hits a variable number of shots and records the outcome of each shot. Each shot played in a given set has the same properties, e.g., type (putt, chip, pitch, bunker, lob, approach, drive), lie, distance to target, club used (including manufacturer, etc.), and the player records the outcome of each shot. The basic process and underlying technology of recording the properties of each set of shots and the outcomes of each shot in the set is similar to that described previously.

The data analysis/visualization component 16 can readily be configured to allow the player to analyze his/her drill performance. For each type of shot, the player can analyze the performance for any number of sets and slice the performance results for any combination of the shot properties. This will allow players, for example, to test out different clubs and determine which club performs best for them.

B. Simulations

In a simulation, the player is presented with a set of short game scenarios. Each scenario provides the player with a context that simulates a short game situation the player might encounter on the golf course. The player then hits one ball until the player holes out and records his/her performance in a manner similar to that described previously.

Each simulation will have an associated set of shot properties (as described previously) and the player is able to store the results of each simulation in the database and subsequently perform detailed analysis.

The simulation scenarios can either be downloaded from the WWW site onto the player's computer or the player can record the performance using a paper representation of the scenario and add the result information directly through the WWW browser. New simulations can be added all the time so golfers can be continuously challenged.

Thus, in accordance with the foregoing the objects of the present invention are achieved. Those of ordinary skill in the art will appreciate that while the specific embodiments disclosed herein relate to the game of golf, many aspects of the present invention may be applied to other sports and activities as well. Moreover, modifications to the above would be obvious to those of ordinary skill in the art, but would not bring the invention so modified beyond the scope of the appended claims.

What is claimed is:

1. A computer-implemented method of analyzing golf performance, said method comprising:

providing a database that is organized for recording player golf performance data, wherein the database is implemented to include a category for shot skill events and include skill subcategories for the events;

receiving golf performance and score data into the database for multiple rounds of golf played by a particular golf player to record that player's personal past performance in the shot skill event category and skill subcategories;

applying statistical analysis to the golf player's recorded data to generate one or more performance statistics from the golf player's recorded data;

providing an interface with which the golf player can interact to request computerized assistance with improving the golf player's game;

in response to the golf player interacting with the interface, displaying information that identifies a particular improvement for that golf player and displays how many shots per round the golf player's score will be improved in order to provide a tool to golfers for evaluating relative improvements in a player's personal game that can be made by achieving different improvements, wherein the improvement in the number of shots is generated in accordance with one or more performance statistics.

2. The method according to claim 1 wherein the performance statistic is a fairways hit percentage.

3. The method according to claim 1 wherein the performance statistic is a greens hit percentage.

4. The method according to claim 1 wherein the performance statistic is a percentage of shots from a given distance range that end up within a specified distance from a hole.

5. The method according to claim 4 wherein a portion of the performance and score data is used with one or more of the performance statistics and the particular improvement to calculate the improvement in number of saved shots per round that will be achieved when that particular improvement is attained by the golf player.

* * * * *